US009015068B1

(12) United States Patent
Bertz et al.

(10) Patent No.: US 9,015,068 B1
(45) Date of Patent: *Apr. 21, 2015

(54) FRAMEWORK FOR REAL-TIME BROKERING OF DIGITAL CONTENT DELIVERY

(75) Inventors: Lyle T. Bertz, Lee's Summit, MO (US); Stephen J. Bye, Atlanta, GA (US); Lyle W. Paczkowski, Mission Hills, KS (US); Daniel J. Sershen, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 224 days.

This patent is subject to a terminal disclaimer.

(21) Appl. No.: 13/594,777

(22) Filed: Aug. 25, 2012

(51) Int. Cl.
G06Q 30/00 (2012.01)
G06Q 30/06 (2012.01)

(52) U.S. Cl.
CPC .................................. *G06Q 30/0633* (2013.01)

(58) Field of Classification Search
USPC ..................................... 705/26.44, 26.1, 26.8
See application file for complete search history.

(56) References Cited

U.S. PATENT DOCUMENTS

| | | |
|---|---|---|
| 5,042,027 A | 8/1991 | Takase et al. |
| 5,303,378 A | 4/1994 | Cohen |
| 5,381,546 A | 1/1995 | Servi et al. |
| 5,673,256 A | 9/1997 | Maine |
| 5,796,952 A | 8/1998 | Davis et al. |
| 6,131,024 A | 10/2000 | Boltz |
| 6,219,712 B1 | 4/2001 | Mann et al. |
| 6,385,168 B1 | 5/2002 | Davis et al. |
| 6,473,622 B1 | 10/2002 | Meuronen |
| 6,477,180 B1 | 11/2002 | Aggarwal et al. |
| 6,567,855 B1 | 5/2003 | Tubbs et al. |
| 6,668,322 B1 | 12/2003 | Wood et al. |
| 6,691,230 B1 | 2/2004 | Bardon |
| 6,754,784 B1 | 6/2004 | North et al. |
| 6,781,991 B1 | 8/2004 | Anderlind |
| 6,823,454 B1 | 11/2004 | Hind et al. |

(Continued)

FOREIGN PATENT DOCUMENTS

| | | |
|---|---|---|
| WO | W02011025433 A1 | 3/2011 |
| WO | 2013170228 A2 | 11/2013 |

(Continued)

OTHER PUBLICATIONS

FAIPP Pre-Interview Communication dated Mar. 20, 2014, U.S. Appl. No. 13/482,731, filed May 29, 2012.

(Continued)

*Primary Examiner* — Kostas Katsikis

(57) ABSTRACT

A method of transmitting digital content. The method comprises receiving an electronic shopping cart identifying at least a first shopping item and determining that the first shopping item is an item of digital content based on analyzing the electronic shopping cart. The method further comprises analyzing a demand for communication network resources and estimating a congestion of a communication network, building a plurality of offers for wirelessly transmitting the first shopping item to a wireless communication device based on analyzing the demand for communication network resources and based on estimating the congestion of the communication network. The method further comprises transmitting the plurality of offers, receiving a selection of one of the offers, and transmitting the digital content based on the selected offer.

18 Claims, 17 Drawing Sheets

(56) References Cited

U.S. PATENT DOCUMENTS

| | | |
|---|---|---|
| 6,824,064 B2 | 11/2004 | Guthery et al. |
| 6,895,234 B1 | 5/2005 | Laursen et al. |
| 7,263,065 B1 | 8/2007 | Cahn |
| 7,387,240 B2 | 6/2008 | Ziegler |
| 7,552,467 B2 | 6/2009 | Lindsay |
| 7,571,364 B2 | 8/2009 | Whetsel |
| 7,650,645 B1 | 1/2010 | Langendorf et al. |
| 7,852,849 B2 | 12/2010 | Davidson et al. |
| 7,873,837 B1 | 1/2011 | Lee et al. |
| 7,895,642 B1 | 2/2011 | Larson et al. |
| 7,921,303 B2 | 4/2011 | Mauro, II |
| 8,060,449 B1 | 11/2011 | Zhu |
| 8,065,424 B2 | 11/2011 | Foresti et al. |
| 8,073,428 B2 | 12/2011 | Khetawat et al. |
| 8,086,238 B1 | 12/2011 | Kosar |
| 8,190,919 B2 | 5/2012 | Natarajan et al. |
| 8,204,480 B1 | 6/2012 | Lindteigen et al. |
| 8,238,823 B2 | 8/2012 | Maugars et al. |
| 8,271,336 B2 * | 9/2012 | Mikurak .......... 705/22 |
| 8,316,237 B1 | 11/2012 | Felsher et al. |
| 8,321,515 B1 | 11/2012 | Gailloux et al. |
| 8,402,543 B1 | 3/2013 | Ranjan et al. |
| 8,413,229 B2 | 4/2013 | Mullick et al. |
| 8,429,409 B1 | 4/2013 | Wall et al. |
| 8,443,420 B2 | 5/2013 | Brown et al. |
| 8,447,983 B1 | 5/2013 | Beck et al. |
| 8,494,576 B1 | 7/2013 | Bye et al. |
| 8,504,097 B1 | 8/2013 | Cope et al. |
| 8,626,860 B1 | 1/2014 | Gailloux et al. |
| 8,631,247 B2 | 1/2014 | O'Loughlin et al. |
| 8,632,000 B2 | 1/2014 | Laracey |
| 8,649,770 B1 | 2/2014 | Cope et al. |
| 8,667,607 B2 | 3/2014 | Paczkowski et al. |
| 8,707,056 B2 | 4/2014 | Felton |
| 8,712,407 B1 | 4/2014 | Cope et al. |
| 8,726,343 B1 | 5/2014 | Borzycki et al. |
| 8,738,333 B1 | 5/2014 | Behera et al. |
| 8,750,839 B1 | 6/2014 | Paczkowski et al. |
| 8,752,140 B1 | 6/2014 | Paczkowski et al. |
| 8,762,298 B1 | 6/2014 | Ranjan et al. |
| 8,787,873 B1 | 7/2014 | Hitt et al. |
| 8,793,808 B2 | 7/2014 | Boccon-Gibod |
| 8,831,998 B1 * | 9/2014 | Cramer et al. .......... 705/59 |
| 8,839,460 B2 | 9/2014 | Shirlen et al. |
| 8,850,568 B2 | 9/2014 | Shirlen et al. |
| 8,856,600 B2 | 10/2014 | Zadigian et al. |
| 8,862,181 B1 | 10/2014 | Cope et al. |
| 8,863,252 B1 | 10/2014 | Katzer et al. |
| 8,881,977 B1 | 11/2014 | Paczkowski et al. |
| 8,954,588 B1 | 2/2015 | Bertz et al. |
| 2002/0035697 A1 | 3/2002 | McCurdy et al. |
| 2002/0091569 A1 | 7/2002 | Kitaura et al. |
| 2002/0095389 A1 | 7/2002 | Gaines |
| 2002/0156911 A1 | 10/2002 | Croman et al. |
| 2002/0174344 A1 | 11/2002 | Ting |
| 2002/0181503 A1 | 12/2002 | Montgomery, Jr. |
| 2002/0184325 A1 | 12/2002 | Killcommons et al. |
| 2002/0194361 A1 | 12/2002 | Itoh et al. |
| 2002/0194496 A1 | 12/2002 | Griffin et al. |
| 2003/0028640 A1 | 2/2003 | Malik |
| 2003/0065724 A1 | 4/2003 | Clark |
| 2003/0093667 A1 | 5/2003 | Dutta et al. |
| 2003/0110046 A1 | 6/2003 | Cofta |
| 2003/0126225 A1 | 7/2003 | Camble et al. |
| 2003/0172163 A1 | 9/2003 | Fujita et al. |
| 2003/0237002 A1 | 12/2003 | Oishi et al. |
| 2004/0158840 A1 | 8/2004 | Rothman et al. |
| 2004/0202328 A1 | 10/2004 | Hara |
| 2004/0233844 A1 | 11/2004 | Yu et al. |
| 2004/0234049 A1 | 11/2004 | Melideo |
| 2004/0243810 A1 | 12/2004 | Ringborg et al. |
| 2005/0015601 A1 | 1/2005 | Tabi |
| 2005/0052994 A1 | 3/2005 | Lee |
| 2005/0091505 A1 | 4/2005 | Riley et al. |
| 2005/0138433 A1 | 6/2005 | Linetsky |
| 2005/0235166 A1 | 10/2005 | England et al. |
| 2005/0239481 A1 | 10/2005 | Seligmann |
| 2005/0289355 A1 | 12/2005 | Kitariev et al. |
| 2006/0030291 A1 | 2/2006 | Dawson et al. |
| 2006/0036851 A1 | 2/2006 | DeTreville |
| 2006/0040641 A1 | 2/2006 | Dawson et al. |
| 2006/0156026 A1 | 7/2006 | Utin |
| 2006/0190605 A1 | 8/2006 | Franz et al. |
| 2006/0212853 A1 | 9/2006 | Sutardja |
| 2006/0224901 A1 | 10/2006 | Lowe |
| 2006/0245438 A1 | 11/2006 | Sajassi et al. |
| 2006/0259790 A1 | 11/2006 | Asokan et al. |
| 2006/0261949 A1 | 11/2006 | Kim et al. |
| 2006/0277307 A1 | 12/2006 | Bernardin et al. |
| 2006/0277433 A1 | 12/2006 | Largman et al. |
| 2007/0011061 A1 | 1/2007 | East |
| 2007/0038648 A1 | 2/2007 | Chetwood et al. |
| 2007/0061535 A1 | 3/2007 | Xu et al. |
| 2007/0078988 A1 | 4/2007 | Miloushev et al. |
| 2007/0079120 A1 | 4/2007 | Bade et al. |
| 2007/0094273 A1 | 4/2007 | Fritsch et al. |
| 2007/0094691 A1 | 4/2007 | Gazdznski |
| 2007/0118880 A1 | 5/2007 | Mauro, II |
| 2007/0143210 A1 | 6/2007 | Yeung et al. |
| 2007/0162759 A1 | 7/2007 | Buskey et al. |
| 2007/0167167 A1 | 7/2007 | Jiang |
| 2007/0177771 A1 | 8/2007 | Tanaka et al. |
| 2007/0180120 A1 | 8/2007 | Bainbridge et al. |
| 2007/0186212 A1 | 8/2007 | Mazzaferri et al. |
| 2007/0197261 A1 | 8/2007 | Humbel |
| 2007/0214332 A1 | 9/2007 | Sonoda et al. |
| 2007/0276969 A1 | 11/2007 | Bressy et al. |
| 2007/0277223 A1 | 11/2007 | Datta et al. |
| 2008/0014867 A1 | 1/2008 | Finn |
| 2008/0022374 A1 | 1/2008 | Brown et al. |
| 2008/0082678 A1 | 4/2008 | Lorch et al. |
| 2008/0092213 A1 | 4/2008 | Wei et al. |
| 2008/0097793 A1 | 4/2008 | Dicks et al. |
| 2008/0121687 A1 | 5/2008 | Buhot |
| 2008/0159129 A1 | 7/2008 | Songhurst et al. |
| 2008/0159131 A1 | 7/2008 | Hoeflin et al. |
| 2008/0162361 A1 | 7/2008 | Sklovsky |
| 2008/0176538 A1 | 7/2008 | Terrill et al. |
| 2008/0188178 A1 | 8/2008 | Maugars et al. |
| 2008/0198875 A1 | 8/2008 | Qin et al. |
| 2008/0201212 A1 | 8/2008 | Hammad et al. |
| 2008/0201578 A1 | 8/2008 | Drake |
| 2008/0208681 A1 | 8/2008 | Hammad et al. |
| 2008/0212503 A1 | 9/2008 | Lipford et al. |
| 2008/0244758 A1 | 10/2008 | Sahita et al. |
| 2009/0047923 A1 | 2/2009 | Jain et al. |
| 2009/0055278 A1 | 2/2009 | Nemani |
| 2009/0070272 A1 | 3/2009 | Jain |
| 2009/0075592 A1 | 3/2009 | Nystrom et al. |
| 2009/0089449 A1 | 4/2009 | Day |
| 2009/0113425 A1 | 4/2009 | Ports et al. |
| 2009/0144161 A1 | 6/2009 | Fisher |
| 2009/0147958 A1 | 6/2009 | Calcaterra et al. |
| 2009/0154348 A1 | 6/2009 | Newman |
| 2009/0182634 A1 | 7/2009 | Park et al. |
| 2009/0193491 A1 | 7/2009 | Rao |
| 2009/0271321 A1 | 10/2009 | Stafford |
| 2009/0281947 A1 | 11/2009 | Erel |
| 2009/0300599 A1 | 12/2009 | Piotrowski |
| 2009/0320028 A1 | 12/2009 | Gellerich et al. |
| 2010/0031325 A1 | 2/2010 | Maigne et al. |
| 2010/0052844 A1 | 3/2010 | Wesby |
| 2010/0077487 A1 | 3/2010 | Travis et al. |
| 2010/0082977 A1 | 4/2010 | Boyle et al. |
| 2010/0125904 A1 | 5/2010 | Nice et al. |
| 2010/0128598 A1 | 5/2010 | Gandhewar et al. |
| 2010/0130170 A1 | 5/2010 | Liu et al. |
| 2010/0142517 A1 | 6/2010 | Montemurro et al. |
| 2010/0146589 A1 | 6/2010 | Safa |
| 2010/0153721 A1 | 6/2010 | Mellqvist |
| 2010/0162028 A1 | 6/2010 | Frank et al. |
| 2010/0190469 A1 | 7/2010 | Vanderveen et al. |
| 2010/0198943 A1 | 8/2010 | Harrang et al. |
| 2010/0217709 A1 | 8/2010 | Aabye et al. |

(56) References Cited

U.S. PATENT DOCUMENTS

| | | |
|---|---|---|
| 2010/0223348 A1 | 9/2010 | Przybysz et al. |
| 2010/0228937 A1 | 9/2010 | Bae et al. |
| 2010/0241847 A1 | 9/2010 | van der Horst et al. |
| 2010/0246818 A1 | 9/2010 | Yao |
| 2010/0269156 A1 | 10/2010 | Hohlfeld et al. |
| 2010/0274726 A1 | 10/2010 | Florek et al. |
| 2010/0279653 A1 | 11/2010 | Poltorak |
| 2010/0281139 A1 | 11/2010 | Deprun |
| 2010/0291896 A1 | 11/2010 | Corda |
| 2010/0299313 A1 | 11/2010 | Orsini et al. |
| 2010/0306353 A1 | 12/2010 | Briscoe et al. |
| 2010/0318802 A1 | 12/2010 | Balakrishnan |
| 2010/0328064 A1 | 12/2010 | Rogel |
| 2011/0010720 A1 | 1/2011 | Smith et al. |
| 2011/0014948 A1 | 1/2011 | Yeh |
| 2011/0021175 A1 | 1/2011 | Florek et al. |
| 2011/0035604 A1 | 2/2011 | Habraken |
| 2011/0055084 A1 | 3/2011 | Singh |
| 2011/0078081 A1 | 3/2011 | Pirzadeh et al. |
| 2011/0082711 A1 | 4/2011 | Poeze et al. |
| 2011/0112968 A1 | 5/2011 | Florek et al. |
| 2011/0113479 A1 | 5/2011 | Ganem |
| 2011/0138064 A1 | 6/2011 | Rieger et al. |
| 2011/0145926 A1 | 6/2011 | Dalcher et al. |
| 2011/0154032 A1 | 6/2011 | Mauro, II |
| 2011/0166883 A1 | 7/2011 | Palmer et al. |
| 2011/0173090 A1* | 7/2011 | Miller et al. .......... 705/26.8 |
| 2011/0202916 A1 | 8/2011 | VoBa et al. |
| 2011/0212707 A1 | 9/2011 | Mahalal |
| 2011/0216701 A1 | 9/2011 | Patel et al. |
| 2011/0226853 A1 | 9/2011 | Soh et al. |
| 2011/0237190 A1 | 9/2011 | Jolivet |
| 2011/0238573 A1 | 9/2011 | Varadarajan |
| 2011/0238992 A1 | 9/2011 | Jancula et al. |
| 2011/0246609 A1 | 10/2011 | Kim |
| 2011/0251892 A1 | 10/2011 | Laracey |
| 2011/0258462 A1 | 10/2011 | Robertson et al. |
| 2011/0276677 A1 | 11/2011 | Osuga et al. |
| 2011/0281558 A1 | 11/2011 | Winter |
| 2011/0294418 A1 | 12/2011 | Chen |
| 2012/0003983 A1 | 1/2012 | Sherlock et al. |
| 2012/0011572 A1 | 1/2012 | Chew et al. |
| 2012/0021683 A1 | 1/2012 | Ma et al. |
| 2012/0023583 A1 | 1/2012 | Sallam |
| 2012/0028575 A1 | 2/2012 | Chen et al. |
| 2012/0029997 A1 | 2/2012 | Khan et al. |
| 2012/0036347 A1 | 2/2012 | Swanson et al. |
| 2012/0052801 A1 | 3/2012 | Kulkarni |
| 2012/0072481 A1 | 3/2012 | Nandlall et al. |
| 2012/0072979 A1 | 3/2012 | Cha et al. |
| 2012/0084211 A1 | 4/2012 | Petrov et al. |
| 2012/0084438 A1 | 4/2012 | Raleigh et al. |
| 2012/0084836 A1 | 4/2012 | Mahaffey et al. |
| 2012/0089700 A1 | 4/2012 | Safruti et al. |
| 2012/0102202 A1 | 4/2012 | Omar |
| 2012/0115433 A1 | 5/2012 | Young et al. |
| 2012/0123868 A1 | 5/2012 | Brudnicki et al. |
| 2012/0130839 A1 | 5/2012 | Koh et al. |
| 2012/0131178 A1 | 5/2012 | Zhu et al. |
| 2012/0137117 A1 | 5/2012 | Bosch et al. |
| 2012/0137119 A1 | 5/2012 | Doerr et al. |
| 2012/0143703 A1 | 6/2012 | Wall et al. |
| 2012/0147750 A1 | 6/2012 | Pelletier et al. |
| 2012/0149327 A1 | 6/2012 | Raboisson et al. |
| 2012/0158467 A1 | 6/2012 | Hammad et al. |
| 2012/0159163 A1 | 6/2012 | von Behren et al. |
| 2012/0159612 A1 | 6/2012 | Reisgies |
| 2012/0163206 A1 | 6/2012 | Leung et al. |
| 2012/0168494 A1 | 7/2012 | Kim |
| 2012/0178365 A1 | 7/2012 | Katz et al. |
| 2012/0178366 A1 | 7/2012 | Levy et al. |
| 2012/0190332 A1 | 7/2012 | Charles |
| 2012/0198519 A1 | 8/2012 | Parla et al. |
| 2012/0202423 A1 | 8/2012 | Tiedemann et al. |
| 2012/0207165 A1 | 8/2012 | Davis |
| 2012/0226582 A1 | 9/2012 | Hammad |
| 2012/0226772 A1 | 9/2012 | Grube et al. |
| 2012/0238206 A1 | 9/2012 | Singh et al. |
| 2012/0252480 A1 | 10/2012 | Krutt et al. |
| 2012/0255016 A1 | 10/2012 | Sallam |
| 2012/0258690 A1 | 10/2012 | Chen et al. |
| 2012/0259722 A1* | 10/2012 | Mikurak .......... 705/26.1 |
| 2012/0266076 A1 | 10/2012 | Lockhart et al. |
| 2012/0266220 A1 | 10/2012 | Brudnicki et al. |
| 2012/0272306 A1 | 10/2012 | Benaloh et al. |
| 2012/0284195 A1 | 11/2012 | McMillen et al. |
| 2012/0291095 A1 | 11/2012 | Narendra et al. |
| 2012/0295588 A1 | 11/2012 | Chen et al. |
| 2012/0297187 A1 | 11/2012 | Paya et al. |
| 2012/0303961 A1 | 11/2012 | Kean et al. |
| 2012/0304286 A1 | 11/2012 | Croll et al. |
| 2012/0309345 A1 | 12/2012 | Wake et al. |
| 2012/0324293 A1 | 12/2012 | Grube et al. |
| 2013/0014259 A1 | 1/2013 | Gribble et al. |
| 2013/0035056 A1 | 2/2013 | Prasad et al. |
| 2013/0047197 A1 | 2/2013 | Saroiu et al. |
| 2013/0054474 A1 | 2/2013 | Yeager |
| 2013/0062417 A1 | 3/2013 | Lee et al. |
| 2013/0067552 A1 | 3/2013 | Hawkes et al. |
| 2013/0086385 A1 | 4/2013 | Poeluev |
| 2013/0086684 A1 | 4/2013 | Mohler |
| 2013/0097302 A9 | 4/2013 | Khedouri et al. |
| 2013/0109307 A1 | 5/2013 | Reisgies et al. |
| 2013/0111095 A1 | 5/2013 | Mehrotra et al. |
| 2013/0117186 A1 | 5/2013 | Weinstein et al. |
| 2013/0136126 A1 | 5/2013 | Wang et al. |
| 2013/0138521 A1 | 5/2013 | Want et al. |
| 2013/0138959 A1 | 5/2013 | Pelly et al. |
| 2013/0140360 A1 | 6/2013 | Graylin |
| 2013/0143489 A1 | 6/2013 | Morris et al. |
| 2013/0145429 A1 | 6/2013 | Mendel et al. |
| 2013/0159186 A1 | 6/2013 | Burdnicki et al. |
| 2013/0159710 A1 | 6/2013 | Khan |
| 2013/0160120 A1 | 6/2013 | Malaviya et al. |
| 2013/0174147 A1 | 7/2013 | Sahita et al. |
| 2013/0191632 A1 | 7/2013 | Spector et al. |
| 2013/0212704 A1 | 8/2013 | Shablygin et al. |
| 2013/0262264 A1* | 10/2013 | Karstoft .......... 705/26.8 |
| 2013/0263212 A1 | 10/2013 | Faltyn et al. |
| 2013/0305333 A1 | 11/2013 | Katzer et al. |
| 2013/0332456 A1 | 12/2013 | Arkin |
| 2013/0343181 A1 | 12/2013 | Stroud et al. |
| 2013/0345530 A1 | 12/2013 | McRoberts et al. |
| 2013/0347103 A1 | 12/2013 | Veteikis et al. |
| 2014/0047548 A1 | 2/2014 | Bye et al. |
| 2014/0074508 A1 | 3/2014 | Ying et al. |
| 2014/0155025 A1 | 6/2014 | Parker et al. |
| 2014/0188738 A1 | 7/2014 | Huxham |
| 2014/0245444 A1 | 8/2014 | Lutas et al. |
| 2014/0254381 A1 | 9/2014 | Racz et al. |
| 2014/0279558 A1 | 9/2014 | Kadi et al. |
| 2014/0281544 A1 | 9/2014 | Paczkowski et al. |

FOREIGN PATENT DOCUMENTS

| | | |
|---|---|---|
| WO | 2014004590 A2 | 1/2014 |
| WO | 2014018575 A2 | 1/2014 |
| WO | 2014025687 A2 | 2/2014 |
| WO | WO2014158431 A1 | 10/2014 |

OTHER PUBLICATIONS

Notice of Allowance dated May 27, 2014, U.S. Appl. No. 13/482,731, filed May 29, 2012.
FAIPP Pre-Interview Communication dated Oct. 24, 2012, U.S. Appl. No. 13/463,797, filed May 3, 2012.
Notice of Allowance dated Mar. 1, 2013, U.S. Appl. No. 13/463,797, filed May 3, 2012.
FAIPP Pre-Interview Communication dated Jun. 12, 2013, U.S. Appl. No. 13/440,980, filed Apr. 5, 2012.
Final Office Action dated Sep. 9, 2013, U.S. Appl. No. 13/440,980, filed Apr. 5, 2012.
Notice of Allowance dated Nov. 29, 2013, U.S. Appl. No. 13/440,980, filed Apr. 5, 2012.

(56) References Cited

OTHER PUBLICATIONS

FAIPP Pre-Interview Communication dated Oct. 24, 2012, U.S. Appl. No. 13/463,801, filed May 3, 2012.
Notice of Allowance dated Mar. 14, 2013, U.S. Appl. No. 13/463,801, filed May 3, 2012.
FAIPP Pre-Interview Communication dated Jul. 25, 2013, U.S. Appl. No. 13/470,203, filed May 11, 2012.
Final Office Action dated Mar. 27, 2014, U.S. Appl. No. 13/470,203, filed May 11, 2012.
Advisory Action dated May 29, 2014, U.S. Appl. No. 13/470,203, filed May 11, 2012.
FAIPP Pre-Interview Communication dated May 12, U.S. Appl. No. 13/294,177, filed Nov. 11, 2011.
FAIPP Pre-Interview Communication dated Jun. 6, 2013, U.S. Appl. No. 13/571,348, filed Aug. 10, 2012.
Office Action dated Sep. 25, 2013, U.S. Appl. No. 13/571,348, filed Aug. 10, 2012.
Final Office Action dated Apr. 10, 2014, U.S. Appl. No. 13/571,348, filed Aug. 10, 2012.
Advisory Action dated Jun. 23, 2014, U.S. Appl. No. 13/571,348, filed Aug. 10, 2012.
Notice of Allowance dated Aug. 30, 2013; U.S. Appl. No. 13/540,437, filed Jul. 2, 2012.
Restriction Requirement dated Nov. 1, 2013, U.S. Appl. No. 13/557,213, filed Jul. 25, 2012.
Office Action dated Dec. 19, 2013, U.S. Appl. No. 13/557,213, filed Jul. 25, 2012.
Notice of Allowance dated Jun. 4, 2014, U.S. Appl. No. 13/557,213, filed Jul. 25, 2012.
FAIPP Pre-Interview Communication dated Nov. 27, 2013, U.S. Appl. No. 13/610,856, filed Sep. 11, 2012.
Notice of Allowance date Jan. 31, 2014, U.S. Appl. No. 13/610,856, filed Sep. 11, 2012.
FAIPP Pre-Interview Communication dated Jun. 5, 2013, U.S. Appl. No. 13/556,200, filed Jul. 24, 2012.
First Action Interview Office Action dated Aug. 19, 2013, U.S. Appl. No. 13/556,200, filed Jul. 24, 2012.
Notice of Allowance dated Oct. 16, 2013, U.S. Appl. No. 13/556,200, filed Jul. 24, 2012.
FAIPP Pre-Interview Communication dated Aug. 4, 2014, U.S. Appl. No. 13/844,357, filed Mar. 15, 2013.
FAIPP Pre-Interview Communication dated Apr. 3, 2014, U.S. Appl. No. 13/802,383, filed Mar. 13, 2013.
First Action Interview Office Action dated May 23, 2014, U.S. Appl. No. 13/802,383, filed Mar. 13, 2013.
Notice of Allowance dated Jul. 8, 2014, U.S. Appl. No. 13/802,383, filed Mar. 13, 2013.
FAIPP Pre-Interview Communication dated Jul. 17, 2014, U.S. Appl. No. 13/594,778, filed Aug. 25, 2012.
FAIPP Pre-Interview Communication dated Jul. 17, 2014, U.S. Appl. No. 13/594,779, filed Aug. 25, 2012.
Office Action dated May 5, 2014, U.S. Appl. No. 13/786,450, filed Mar. 5, 2013.
FAIPP Pre-Interview Communication dated Aug. 6, 2014, U.S. Appl. No. 13/831,486, filed Mar. 14, 2013.
First Action Interview Pre-Interview Communication dated Dec. 27, 2011, U.S. Appl. No. 12/486,873, filed Jun. 18, 2009.
First Action Interview Office Action dated Feb. 13, 2012, U.S. Appl. No. 12/486,873, filed Jun. 18, 2009.
Office Action dated Jul. 5, 2012, U.S. Appl. No. 12/486,873, filed Jun. 18, 2009.
Final Office Action dated Feb. 1, 2013, U.S. Appl. No. 12/486,873, filed Jun. 18, 2009.
Notice of Allowance dated Jan. 28, 2014, U.S. Appl. No. 12/486,873, filed Jun. 18, 2009.
Zimmerman, Ann, "Check Out the Future of Shopping", The Wall Street Journal, Business, May 18, 2011, http:// online.wsj.com/article/SB10001424052748703421204576329253050634700.html.
Garry, Michael, Kroger Test Prepares for Mobile Future:, SN, Supermarket News, Jun. 13, 2011, http://supermarketnews.com/technology/kroger-test-prepares-mobile-future.
Jones, Sally, "Industry Trends in POS Hardware for Mobile Devices", Aug. 31, 2011, http://pointofsale.com/20110831734/Mobile-POS-News/industry-trends-in-pos-hardware-for-mobile-devices.html.
Foreign Communication from a Related Counterpart—International Search Report and Written Opinion, dated Dec. 2, 2013, PCT/US13/40673, filed on May 10, 2013.
Giesecke & Devrient, "The OTA Platform in the World of LTE", Jan. 2011, http://www.gi-de.com/gd_media/media/en/documents/brochures/mobile_security_2/cste_1/OTA-and-LTE.pdf.
Pesonen, Lauri, "Development of Mobile Payment Ecosystem—NFC Based Payment Services", Aug. 27, 2008.
Foreign Communication from a Related Counterpart—International Search Report and Written Opinion, dated Feb. 4, 2014, PCT/US13/47729, filed on Jun. 25, 2013.
Foreign Communication from a Related Counterpart—International Search Report and Written Opinion, dated Feb. 4, 2014, PCT/US13/51750, filed on Jul. 24, 2013.
Foreign Communication from a Related Counterpart—International Search Report and Written Opinion, dated Apr. 22, 2014, PCT/US13/53617, filed on Aug. 5, 2013.
Foreign Communication from a Related Counterpart—International Search Report and Written Opinion, dated Jul. 11, 2014, PCT/US14/16651, filed on Feb. 16, 2014.
Cope, Warren B., et al., "Electronic Purchase Transaction Trust Infrastructure", filed May 29, 2012, U.S. Appl. No. 13/482,731.
Katzer, Robin D., et al., "Secure Placement of Centralized Media Controller Application in Mobile Access Terminal", filed Nov. 11, 2011, U.S. Appl. No. 13/294,177.
Paczkowski, Lyle W., et al., "Trusted Policy and Charging Enforcement Function", filed Jun. 27, 2012, U.S. Appl. No. 13/533,969.
Bye, Stephen James, et al., "Trusted Signaling in Long Term Evolution (LTE) 4G Wireless Communication", filed Feb. 7, 2013, U.S. Appl. No. 13/762,319.
Cope, Warren B., et al., "Extended Trusted Security Zone Radio Modem", filed Nov. 26, 2013, U.S. Appl. No. 14/090,667.
Katzer, Robin D., et al., "Trusted Access to Third Party Applications Systems and Methods", filed Jul. 25, 2012, U.S. Appl. No. 13/557,213.
Paczkowski, Lyle W., et al., "Trusted Security Zone Access to Peripheral Devices", filed Jul. 24, 2013, PCT Application No. PCT/US13/51750.
Paczkowski, Lyle W., et al., "Trusted Security Zone Access to Peripheral Devices", filed Jan. 6, 2014, U.S. Appl. No. 14/148,714.
Paczkowski, Lyle W., et al., Enablement of a Trusted Security Zone Authentication for Remote Mobile Device Management Systems and Methods, filed Mar. 15, 2013, U.S. Appl. No. 13/844,357.
Paczkowski, Lyle W., et al., "Trusted Security Zone Communication Addressing on an Electronic Device", filed Mar. 15, 2013, U.S. Appl. No. 13/844,145.
Bye, Stephen James, et al., "Protection for Multimedia Files Pre-Downloaded to a Mobile Device", filed Apr. 15, 2013, U.S. Appl. No. 13/863,376.
Paczkowski, Lyle W., et al., "Point-of-Sale and Automated Teller Machine Transactions Using Trusted Mobile Access Device", filed Mar. 13, 2013, U.S. Appl. No. 13/802,383.
Kunkel, Philip M., et al., "Secure Peer-to-Peer Call Forking Facilitated by Trusted 3rd Party Voice Server Provisioning", filed Oct. 29, 2013, U.S. Appl. No. 14/066,661.
Paczkowski, Lyle W., et al., "Trusted Security Zone Watermark", filed Mar. 5, 2013, U.S. Appl. No. 13/786,450.
Paczkowski, Lyle W., et al., "Trusted Security Zone Re-Provisioning and Re-Use Capability for Refurbished Mobile Devices", filed Mar. 14, 2013, U.S. Appl. No. 13/831,486.
Paczkowski, Lyle W., et al., "Trusted Security Zone Enhanced with Trusted Hardware Drivers", filed Mar. 13, 2013, U.S. Appl. No. 13/802,404.

(56) References Cited

OTHER PUBLICATIONS

Paczkowski, Lyle W., et al., "Method for Enabling Hardware Assisted Operating System Region for Safe Execution of Untrusted Code Using Trusted Transitional Memory", filed May 20, 2013, U.S. Appl. No. 13/898,435.
Paczkowski, Lyle W., et al., "Trusted Processing Location Within a Graphics Processing Unit", filed Jul. 10, 2013, U.S. Appl. No. 13/939,175.
Paczkowski, Lyle W., et al., "Restricting Access of a Portable Communication Device to Confidential Data or Applications via a Remote Network Based on Event Triggers Generated by the Portable Communication Device", filed Mar. 15, 2013, U.S. Appl. No. 13/844,282.
Paczkowski, Lyle W., et al., "JTAG Fuse Vulnerability Determination and Protection Using a Trusted Execution Environment", filed Mar. 15, 2013, U.S. Appl. No. 13/844,325.
Paczkowski, Lyle W., et al., "Trusted Security Zone Containers for the Protection and Confidentiality of Trusted Service Manager Data", filed Mar. 14, 2013, U.S. Appl. No. 13/831,463.
Paczkowski, Lyle W., et al., "Trusted Security Zone Containers for the Protection and Confidentiality of Trusted Service Manager Data", filed Feb. 16, 2014, PCT Application No. PCT/US14/16651.
Paczkowski, Lyle W., et al., "Verifying Applications Using a Trusted Security Zone", filed Aug. 12, 2013, U.S. Appl. No. 13/964,112.
Bye, Stephen James, et al., "Delivering Digital Content to a Mobile Device via a Digital Rights Clearing House", filed Apr. 10, 2013, U.S. Appl. No. 13/860,338.
McCracken, Billy Gene, Jr., et al. "Mobile Communication Device Profound Identity Brokering Framework", filed Jun. 6, 2013, U.S. Appl. No. 13/912,190.
Urbanek, Robert E., Subscriber Identity Module Virtualization:, filed Nov. 20, 2013, U.S. Appl. No. 14/085,474.
Krieger, Michael D., et al., "Billing Varied Service Based on Tier", filed Nov. 8, 2013, U.S. Appl. No. 14/075,663.
Paczkowski, Lyle W., et al., "Trusted Display and Transmission of Digital Ticket Documentation", filed Jan. 24, 2014, U.S. Appl. No. 14/163,047.
Loman, Clint H., et al., "Verification of Mobile Device Integrity During Activation", filed Mar. 28, 2014, U.S. Appl. No. 14/229,532.
Paczkowski, Lyle W., et al., "Network Based Temporary Trust Extension to a Remote or Mobile Device Enabled via Specialized Cloud Services", filed Jul. 29, 2014, U.S. Appl. No. 14/446,330.
Cordes, Kevin R., et al., "Digest of Biographical Information for an Electronic Device with Static and Dynamic Portions", filed Apr. 4, 2013, U.S. Appl. No. 13/857,141.
Cordes, Kevin R., et al., "Radio Frequency Identity (RFID) Chip Electrically and Communicatively Coupled to Motherboard of Mobile Communication Device", filed Apr. 4, 2013, U.S. Appl. No. 13/857,139.
Cordes, Kevin R., et al., "System for Managing a Digest of Biographical Information Stored in a Radio Frequency Identity Chip Coupled to a Mobile Communication Device", filed Apr. 4, 2013, U.S. Appl. No. 13/857,138.
Ahmed, Farid, et al., "Correlation-based Watermarking Method for Imagine Authentication Applications", Society of Photo-Optical Instrumentation Engineers, Feb. 17, 2004, pp. 1834-1838.
Pre-Interview Communication dated Jan. 27, 2012, U.S. Appl. No. 12/428,276, filed Apr. 22, 2009.
First Action Interview Office Action dated Apr. 20, 2012, U.S. Appl. No. 12/428,276, filed Apr. 22, 2009.
Notice of Allowance dated Jul. 19, 2012, U.S. Appl. No. 12/428,276, filed Apr. 22, 2009.
Pre-Interview Communication dated May 1, 2013, U.S. Appl. No. 13/606,012, filed Sep. 7, 2012.
Notice of Allowance dated Aug. 30, 2013, U.S. Appl. No. 13/606,012, filed Sep. 7, 2012.
Bertz, Lyle T., et al., Patent Application entitled, "Reservations in Real-Time Brokering of Digital Content Delivery," filed Aug. 25, 2012, U.S. Appl. No. 13/594,778.
Bertz, Lyle T., et al., Patent Application entitled, "File Retrieval in Real-Time Brokering of Digital Content Delivery," filed Aug. 25, 2012, U.S. Appl. No. 13/594,779.
Gailloux, Michael A., et al., Patent Application entitled, "Defined Delays to Support Consistent Tiered Messaging Performance," filed Sep. 7, 2012, U.S. Appl. No. 13/606,012.
Office Action dated Aug. 29, 2014, U.S. Appl. No. 13/470,203, filed May 11, 2012.
Notice of Allowance dated Oct. 8, 2014, U.S. Appl. No. 13/294,177, filed Nov. 11, 2011.
FAIPP Pre-Interview Communication dated Sep. 25, 2014, U.S. Appl. No. 13/533,969, filed Jun. 27, 2012.
Notice of Allowance dated Oct. 6, 2014, U.S. Appl. No. 13/844,357, filed Mar. 15, 2013.
FAIPP Pre-Interview Communication dated Nov. 12, 2014, U.S. Appl. No. 13/844,145, filed Mar. 15, 2013.
Notice of Allowance dated Sep. 19, 2014, U.S. Appl. No. 13/594,778, filed Aug. 25, 2012.
Final Office Action dated Nov. 7, 2014, U.S. Appl. No. 13/786,450, filed Mar. 5, 2013.
Notice of Allowance dated Sep. 26, 2014, U.S. Appl. No. 13/831,486, filed Mar. 14, 2013.
FAIPP Pre-Interview Communication dated Nov. 7, 2014, U.S. Appl. No. 13/802,404, filed Mar. 13, 2013.
FAIPP Pre-Interview Communication dated Oct. 29, 2014, U.S. Appl. No. 13/844,282, filed Mar. 15, 2013.
FAIPP Pre-Interview Communication dated Oct. 21, 2014, U.S. Appl. No. 13/844,325, filed Mar. 15, 2013.
Foreign Communication from a Related Counterpart—International Preliminary Report on Patentability, dated Nov. 20, 2014, PCT/US13/40673, filed on May 10, 2013.
Perrig, Adrian, et al., "SPINS: Security Protocols for Sensor Networks," ACM, Sep. 2002, vol. 8, pp. 521-534.
Clark, CJ., et al. "Anti-tamper JTAG TAP design enables DRM to JTAG registers and P1687 on-chip instruments", 2010 IEEE, International Symposium on Hardware-Oriented Security and Trust (HOST). Pub. Date: 2010. Relevant pp. 19-24. http://ieeexplore.ieee.org/stamp/stamp.jsp?tp=&arnumber=5513119.
Lee, Jeremy, et al., "A Low-Cost Solution for Protecting IPs Against Scan-Based Side Channel Attacks," 24th IEEE VLSI Test Symposium. Pub. Date: 2006. http//ieeexplore.ieee.org/stamp/stamp.jsp?tp=&arnumber=1617569.
Notice of Allowance dated Dec. 22, 2014, U.S. Appl. No. 13/470,203, filed May 11, 2012.
Notice of Allowance dated Feb. 5, 2015, U.S. Appl. No. 13/533,969, filed Jun. 27, 2012.
Office Action dated Dec. 15, 2014, U.S. Appl. No. 13/571,348, filed Aug. 10, 2012.
Restriction Requirement dated Jan. 2, 2015, U.S. Appl. No. 13/762,319, filed Feb. 7, 2013.
FAIPP Pre-Interview Communication dated Feb. 12, 2015, U.S. Appl. No. 14/066,661, filed Oct. 29, 2013.
First Action Interview Office Action dated Dec. 3, 2014, U.S. Appl. No. 13/594,779, filed Aug. 25, 2012.
Notice of Allowance dated Feb. 26, 2015, U.S. Appl. No. 13/786,450, filed Mar. 5, 2013.
FAIPP Pre-Interview Communication dated Dec. 16, 2014, U.S. Appl. No. 13/898,435, filed May 20, 2013.
Notice of Allowance dated Feb. 20, 2015, U.S. Appl. No. 13/898,435, filed May 20, 2013.
Notice of Allowance dated Dec. 19, 2014, U.S. Appl. No. 13/844,325, filed Mar. 15, 2013.
Notice of Allowance dated Jan. 2, 2015, U.S. Appl. No. 13/831,463, filed Mar. 14, 2013.
FAIPP Pre-Interview Communication dated Feb. 4, 2015, U.S. Appl. No. 14/075,663, filed Nov. 8, 2013.
FAIPP Pre-Interview Communication dated Feb. 25, 2015, U.S. Appl. No. 14/163,047, filed Jan. 24, 2014.
Restriction Requirement dated Jan. 5, 2015, U.S. Appl. No. 13/857,139, filed Apr. 4, 2013.

(56) References Cited

OTHER PUBLICATIONS

Foreign Communication from a Related Counterpart—International Preliminary Report on Patentability, dated Jan. 8, 2015, PCT/US13/47729, filed on Jun. 25, 2013.

Foreign Communication from a Related Counterpart—International Preliminary Report on Patentability, dated Feb. 19, 2015, PCT/US13/53617, filed on Aug. 5, 2013.

Foreign Communication from a Related Counterpart—International Preliminary Report on Patentability, dated Feb. 5, 2015, PCT/US13/51750, filed on Jul. 24, 2013.

Katzer, Robin D., et al., "Web Server Bypass of Backend Process on Near Field Communications and Secure Elements Chips", filed Feb. 26, 2015, U.S. Appl. No. 14/632,850.

Neson, Tracy L., et al., "Mated Universal Serial Bus (USB) Wireless Dongles Configured with Destination Addresses", filed Jan. 26, 2015, U.S. Appl. No. 14/606,011.

Paczkowski, Lyle W., et al., "Trusted Code Generation and Verification to Prevent Fraud from Maleficent External Devices that Capture Data", filed Jan. 14, 2015, U.S. Appl. No. 14/592,218.

\* cited by examiner

FRAMEWORK FOR REAL-TIME BROKERING OF DIGITAL CONTENT DELIVERY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Many merchants are adapting their business models to incorporate electronic on-line shopping web sites. Potential customers may browse to an on-line storefront, scan a catalog of items offered for sale, study details about an item of interest, place an item in an electronic shopping cart, proceed to checkout, commit to a purchase, and select product delivery options all from the on-line storefront. The on-line storefront may be provided as a website that the customer navigates through.

SUMMARY

In an embodiment, a method of transmitting digital content is disclosed. The method comprises receiving an electronic shopping cart identifying at least a first shopping item and determining that the first shopping item is an item of digital content based on analyzing the electronic shopping cart. The method further comprises analyzing a demand for communication network resources and estimating a congestion of a communication network, building a plurality of offers for wirelessly transmitting the first shopping item to a wireless communication device based on analyzing the demand for communication network resources and based on estimating the congestion of the communication network. The method further comprises transmitting the plurality of offers, receiving a selection of one of the offers, and transmitting the digital content based on the selected offer.

In an embodiment, a method of transmitting digital content is disclosed. The method comprises receiving an electronic shopping cart identifying at least a first shopping item and a second shopping item, determining that the first shopping item and the second shopping item are items of digital content, analyzing a demand for communication network resources, and estimating a congestion of a communication network. The method further comprises building a plurality of candidate offers for wirelessly transmitting the content based on estimating the congestion of the communication network and building a multi-tiered offer for wirelessly transmitting content, wherein the multi-tiered offer comprises at least two but not all of the candidate offers, wherein the multi-tiered offer provides alternatives for delivering the first shopping item and the second shopping item. The method further comprises transmitting the multi-tiered offer, receiving a selection of one of the offers of the multi-tiered offer, and transmitting the digital content based on the selected offer.

In an embodiment, a method of wirelessly transmitting digital content is disclosed. The method comprises receiving an electronic shopping cart identifying at least a first shopping item, determining that the first shopping item is an item of digital content, analyzing a demand for communication network resources, and modeling a congestion of a communication network. The method further comprises building a plurality of offers for wirelessly transmitting the first shopping item based on analyzing the demand for communication network resources and based on modeling the congestion of the communication network, creating an uncommitted reservation of communication network resources based on the plurality of offers, transmitting the plurality of offers, receiving a selection of one of the offers, creating a committed reservation of communication network resources based on the selected offer, and transmitting the content based on the selected offer.

In an embodiment, a method of wirelessly transmitting digital content is disclosed. The method comprises receiving an electronic shopping cart identifying at least a first shopping item, determining that the first shopping item is an item of digital content based on analyzing the electronic shopping cart, and receiving a hypertext transport protocol (HTTP) GET request message. The method further comprises extracting information from the HTTP GET request message, wherein the information comprises at least one of an operating system of a wireless communication device, a model of the wireless communication device, a wireless service provider associated with the wireless communication device, an on-line merchant identity, or a transaction identifier, wherein the wireless communication device placed the at least first shopping item in the electronic shopping cart, analyzing a demand for communication network resources, and estimating a congestion of a communication network. The method further comprises building a plurality of offers for wirelessly transmitting the first shopping item based on analyzing the demand for communication network resources, based on estimating the congestion of the communication network, and based on the information extracted from the HTTP GET request message, transmitting the plurality of offers, receiving a selection of one of the offers, and transmitting the digital content based on the selected offer.

In an embodiment, a method is disclosed. The method comprises receiving by a computer a request for a plurality of options for delivering the digital content via a communication network, determining by a computer a demand for resources of the communication network, and creating a congestion model modeling a congestion of the communication network. The method further comprises building by a computer a plurality of options for delivering the digital content based on the determined demand for resources of the communication network and based on the congestion model, transmitting by a computer the plurality of options, and receiving by a computer a boundary reservation, creating by a computer at least one uncommitted reservation based on the boundary reservation. The method further comprises modifying by a computer the determined demand for resources of the communication network based on the uncommitted reservation, whereby a system for providing a plurality of offers for digital content delivery is supported.

In an embodiment, a method is disclosed. The method comprises receiving by a computer an identification of a digital content item, determining a digital content type and a digital content size of the digital content item, and modeling a congestion of the communication network, wherein the modeling comprises modeling a congestion in a local wireless coverage area associated with a communication device to which the digital content item is to be delivered. The method further comprises determining by a computer a demand for resources of the communication network based at least in part on committed reservations and on uncommitted reservations and building by a computer a plurality of delivery offers based on the determined demand for resources of the communication network and based on modeling of the congestion of the communication network.

In an embodiment, a method is disclosed. The method comprises building by a computer a plurality of digital content delivery offers based on a model of congestion in the communication network and based on a determined demand for resources of the communication network, storing a first uncommitted reservation associated with the plurality of digital content delivery offers, and transmitting by a computer the plurality of digital content delivery offers. The method further comprises receiving by a computer a selection of one of the plurality of digital content delivery offers, storing a committed reservation based on the selection, and deleting the first uncommitted reservation based on the selection, wherein the demand for resources of the communication network is determined at least in part based on at least one uncommitted reservation or on at least one committed reservation.

In an embodiment, a method is disclosed. The method comprises receiving by a computer a request for a uniform resource identifier (URI), determining by a computer based on the request for the uniform resource identifier a communication service provider associated with a communication device, and, when the communication service provider is affiliated with a digital content custom delivery offer building system, transmitting by a computer an image file to be presented by the communication device.

In an embodiment, a method is disclosed. The method comprises determining by a computer an operating system and a model of a mobile device based on a hypertext transport protocol (HTTP) message, determining by a computer a maximum data rate of the mobile device based on the model of the mobile device, determining by a computer a plurality of customized digital content delivery offers based at least in part on the maximum data rate of the mobile device, and transmitting by a computer the plurality of digital content delivery offers to the mobile device.

In an embodiment, a method is disclosed. The method comprises receiving by a computer a hypertext transport protocol (HTTP) GET request message from a communication device and extracting information from the HTTP GET request message by a computer, wherein the information comprises at least a communication service provider associated with the communication device and communication network congestion information. The method further comprises, when the communication service provider identified by extracting information from the HTTP GET message is affiliated with a custom digital content delivery offer system, building by a computer a plurality of offers for delivering a digital content to the communication device via the communication network based on the communication network congestion information extracted from the HTTP GET request message and transmitting by a computer the plurality of offers to the communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
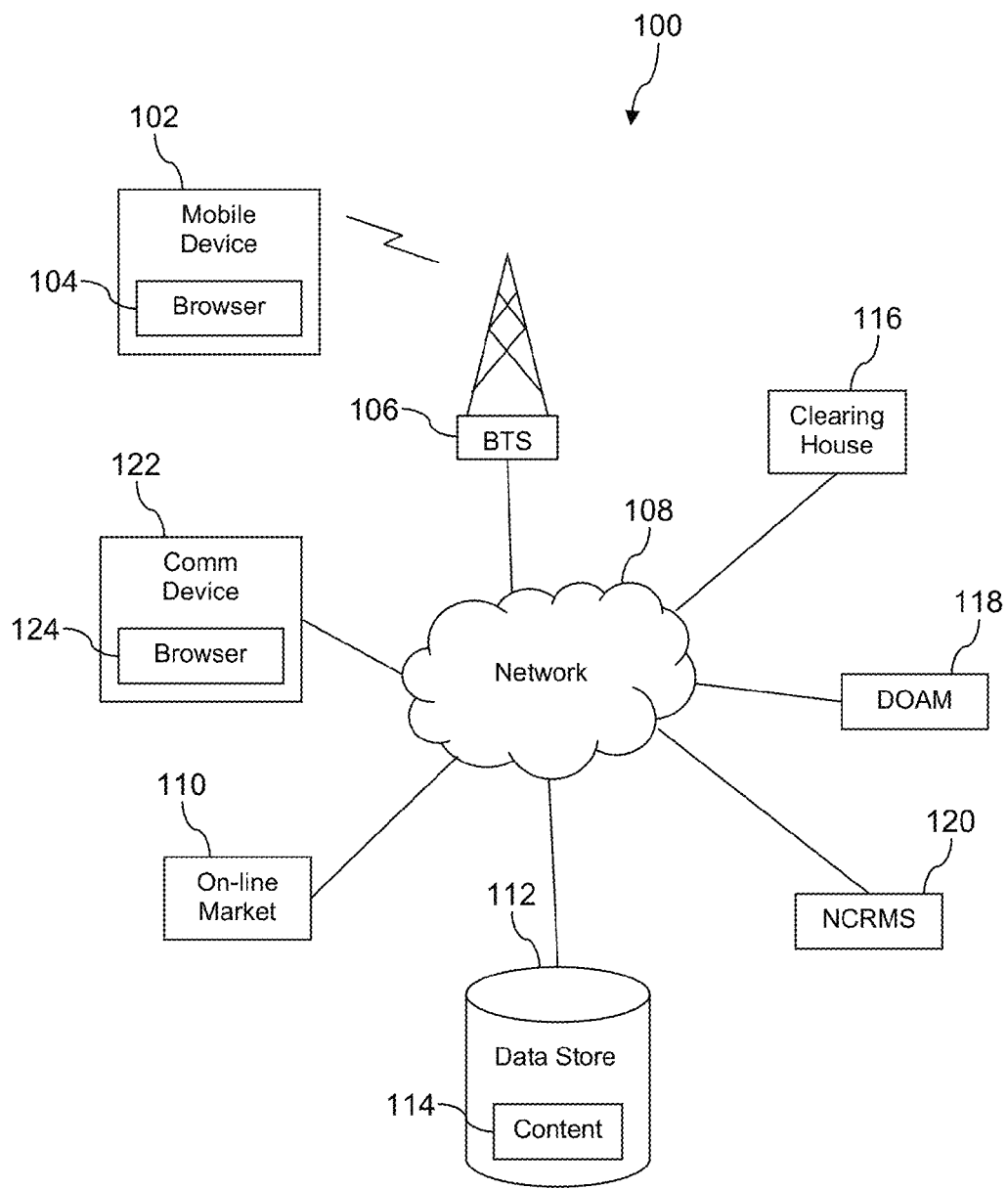
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A communication system is provided for managing delivery of digital content via a communication network. The digital content may be video, music, or other content encoded in digital form and amenable for transmission as data over communication networks. The system provides functions and mechanisms to train and/or to incent users and on-line merchants to consume network communication resources responsibly and conscientiously. The system further provides functions and platforms to support real-time brokering of digital content delivery. As used herein, the term real-time brokering refers to providing a timely response within the context of a user on-line shopping session. For example, the system may be said to provide real-time brokering of digital content delivery when the system builds a plurality of digital content delivery offers customized for the subject user, customized for the current and projected network conditions, and customized based on modeled demand for communication network resources in a time interval that the user deems timely and responsive.

The system provides customized alternative offers for digital content delivery to communication devices that receive communication services from an affiliated and/or participating communication service provider. The system may likewise promote and/or support standard delivery of digital content to communication devices that receive communication services from a communication service provider that does not participate in or is not affiliated with the disclosed framework for providing customized alternative offers for delivery of digital content. Such standard delivery for non-participating and/or non-affiliated communication devices and/or service providers may be restricted to providing best effort delivery of digital content, without providing a plurality of different delivery offers to choose from.

As an example, the system may encourage a user who is content to receive a video digital content later to defer the fulfillment and/or delivery of that video digital content until later in the evening rather than during the busy hour of the communication network. The user may request or purchase digital content from, for example, a mobile phone or a desktop computer. Deferring the delivery of the digital content may not diminish the satisfaction of the user and may reduce the congestion in the network during busy hour, possibly accommodating the needs or preferences of a second user who otherwise may be denied delivery of his or her digital content during the busy hour. For example, the second user may be boarding a plane that takes off in 30 minutes and wants to receive delivery of a video digital content via the network. Since the second user may wish to watch the subject video on the plane during their flight, deferring the delivery of that video until later may not be a viable option. Further, if the second user has to defer the delivery of the subject video, he or she may decide not to purchase the video from an on-line merchant site, thereby disadvantaging the on-line merchant.

In the above example, the real-time brokering system may incent the first user to defer digital content delivery by providing a coupon to the first user or by entering a credit in a communication service subscriber account of the first user. The real-time brokering system may further charge the second user an expedited digital content delivery fee in exchange for providing preferred utilization of limited communication network resources during busy hour, in effect jumping the queue to receive out-of-turn service. By providing incentives for some delivery offers and by charging premiums for other delivery offers, the real-time brokering system may promote the various users of the communication network to sort out their own priorities without imposing an arbitrary and/or inflexible priority structure upon them.

The system may comprise an on-line merchant or on-merchant web site, a clearing house, a delivery offer and assurance manager (DOAM), a network congestion and reservation monitoring system (NORMS), and a content delivery network. When a user shops at the on-line merchant's web site, the user places purchase items in an electronic shopping cart. The purchase items may comprise hardware items such as a lamp, a set of dishes, and the like. The purchase items may further comprise digital content items such as a digital content file comprising a movie video. When the user selects a web site control to proceed to checkout, the web page sends the electronic shopping cart or a copy of the electronic shopping cart to the on-line merchant, for example in a hypertext transfer protocol (HTTP) message. The on-line merchant sends the electronic shopping cart or a copy of the electronic shopping cart to the clearing house. The clearing house examines the contents of the electronic shopping cart and sorts out digital content items from other items. If there are no digital content items, the clearing house returns the electronic shopping cart unchanged to the on-line merchant, and the on-line purchase completes in a customary manner.

When the electronic shopping cart comprises one or more items of digital content that are to be delivered electronically over a communication network, the clearing house receives and/or develops a plurality of delivery offers, adds these offers to the electronic shopping cart, and returns the updated electronic shopping cart to the on-line merchant. The on-line merchant returns the plurality of digital content delivery offers to the user. The user chooses one of the delivery offers, and the selected digital content delivery offer is fulfilled accordingly by the network. The delivery offers may provide different price points or incentives. For example, one offer may be to provide expedited delivery of digital content for a price of $2. In some contexts, offering expedited or higher quality of service digital content delivery in exchange for a fee may be referred to as upselling or as an upsell event. Another offer may be to provide best effort delivery of digital content with no additional fee. Yet another offer may be to provide deferred delivery of digital content in exchange for receiving a coupon or for crediting $1 to a subscription account of the user.

The above examples are only a small sample of the different digital content delivery offers that the system may support. Digital content delivery offers may differ according to several different and/or independent parameters. For example, digital content delivery offers may vary as to a data rate. Digital content delivery offers may differ as to a radio access network portal via which the digital content may be wirelessly delivered to a mobile communication device such as a smart phone or wirelessly enabled laptop computer. Digital content delivery offers may differ as to a delivery type. For example, different delivery types may comprise an expedited delivery type, an "as-soon-as-possible" delivery type, a best effort delivery type, a "no-later-than-time" delivery type, and other delivery types. The offers that are provided to the on-line shopper may combine offers that differ along any or all of these different parameters.

In an embodiment, a relatively large number of candidate offers may be created, and a relatively small number of these candidate offers may be transmitted to the on-line shopper, whereby to reduce the potential to overwhelm or confuse the on-line shopper with an excess number of alternative offers. For example, as many as 30 candidate offers may be identified while only 3 to 7 offers may be transmitted to the on-line shopper. In an embodiment, the checkout page of the on-line shopping web site may provide a control for the shopper and/or user to request additional offers from among all candidate offers. The offers presented to the user may comprise a concise textual identification of the nature of the digital content delivery offer and a price or discount associated with the offer.

Providing a high success rate in fulfillment of offered quality of service in the delivery of digital content is expected to promote user acceptance of the real-time brokering of digital content delivery. Additionally, it is desirable to maintain a communication network loading of about 80% to 90%, for example during relatively busy usage intervals, while maintaining a mix of traffic that is dominated by high margin digital content deliveries, for example content delivery that draws payment of premiums. The clearing house, the digital offer and assurance manager, and the network congestion and reservation monitoring system are designed to achieve and/or promote these objectives.

The check-out web page or other on-line shopping web page may encapsulate an HTML IMAGE tag that references a remotely stored image file, for example a JPEG file or a graphics interchange format (GIF) file. Alternatively, another web page associated with the on-line web site may encapsulate the HTML IMAGE tag or an alternative HTML tag resulting in an HTTP PUT, HTTP POST, or HTTP GET operation (e.g., HTML form tag, HTML anchor tag, etc.). For example, the initial home page may encapsulate the HTML IMAGE tag, a product selection web page may encapsulate the HTML IMAGE tag, or another web page of the on-line shopping web site may encapsulate the HTML IMAGE tag.

When a browser of the user's communication device, for example a browser of a mobile phone or a browser of a desktop computer, renders the check-out web page, the browser attempts to fetch the referenced image file, for example by sending a hypertext transport protocol (HTTP) GET, HTTP POST, or HTTP PUT message to a location identified in the HTML tag. The request may propagate to the clearing house. In an embodiment, the on-line market may provide the request to the clearing house with a token or other data structure that comprises an identity of the on-line market and a unique transaction identity associated with the on-line shopping session. Information about the communication device and the communication device's service provider may be encapsulated in the request. For example, the request may contain information that identifies an operating system of the communication device, a model of the device, an internet protocol address of the device, a gateway through which the device communicates with the communication network, and/or a service provider of the communication device. The request further may encapsulate network congestion information, for example explicit congestion notification (ECN) flags or bits, that may be analyzed to determine, at least in part, a level of congestion of the communication link of the specific communication device. In an embodiment, network congestion may be considered to be the volume of traffic in the network in general and/or the volume of traffic in an end-to-end communication link of interest. The congestion may be due to any traffic, for example voice traffic, text message traffic, email traffic, digital content delivery associated with the instant real-time brokering system, and digital content delivery that is not associated or affiliated with the real-time brokering system.

The clearing house extracts and analyzes this information. If the service provider associated with the communication device is determined to be affiliated with the real-time brokering system, the clearing house may transfer the HTTP GET request message to the delivery offer and assurance manager associated with the subject carrier, and if the user of the communication device is in good standing (his or her service account payment is up-to-date), the delivery offer and assurance manager returns an image file, for example a GIF file or a JPEG file that when rendered by the user's browser presents an icon, symbol, or image associated with the real-time brokering system in the check-out web page. If the user is not in good standing or if the service provider of the user is not affiliated with the real-time brokering system, a transparent image file, such as a transparent GIF file, may be returned such that when rendered by the user's browser does not present any visible image—renders transparently.

Note that the extraction and analysis of the information extracted from the HTTP GET request message (or from the HTTP PUT message or the HTTP POST message) takes place while the user may be attending to miscellaneous check-out activities like providing payment information, shipping address information, and the like. If the HTML IMAGE tag is located in the home page or other on-line shopping web page, the extraction and analysis of the information extracted from the HTTP GET request message may begin even earlier in the shopping experience. The delivery offer and assurance manager may further seek and obtain other information, such as profile information about the user. This profile may comprise indications of user behavior: the user makes a business trip on an airplane once a month during the second week of the month, the user often selects to pay a premium for expedited delivery of digital content, the user sometimes rents movies from a vending machine near his or her place of work, and other profile information. The delivery offer and assurance manager may also transmit this profile information to the clearing house. Performing this analysis, either while the user is finishing other check-out activities or possibly earlier while the user is browsing the on-line shopping site before proceeding to check-out, may reduce the delay of building and returning digital content delivery offers to the user.

The clearing house may promote interworking with multiple communication service providers. The clearing house mediates among the various components and or servers of the real-time brokering system. After sorting the electronic shopping cart, the clearing house sends an identification of the digital content items in the shopping cart, for example a list of digital content items, to the delivery offer and assurance manager. In a multi-carrier system, the clearing house may send it to the delivery offer and assurance manager that is associated with the carrier that provides a communication service subscription account to the user. The clearing house may identify the carrier by analyzing the information extracted from the GIF request message. The clearing house may send the list of digital content items in a message requesting delivery offers. The clearing house may send the request for delivery offers to any of a variety of delivery offer and assurance managers that are operated by different service providers. For example, the clearing house may send the request for delivery offers to a delivery offer and assurance manager operated by the service provider that provides a communication service subscription to the user of the communication device.

The delivery offer and assurance manager may query a content delivery network to obtain further information about the digital content items. For example, the delivery offer and assurance manager may request metadata about the digital content items or a manifest of the digital content items. The further information may define a content size in numbers of bytes, a content type, and/or a play time of the content. The further information may identify a structure of the digital content, for example a high definition movie version, a digital movie version, supplementary alternative scenes, interviews with individuals involved in making the movie, etc. Alternatively, in an embodiment, the metadata and/or manifest of the digital content items may be provided with the electronic shopping cart that is sent to the clearing house and/or to the delivery offer and assurance manager.

The delivery offer and assurance manager may send the further information about the digital content to the network congestion and reservation monitoring system to request a report. The network congestion and reservation monitoring system may generate a report that comprises a number of digital content delivery options. From this report, the delivery offer and assurance manager may build a relatively large number of delivery candidate offers and return a relatively small number of delivery offers with pricing information to the check-out page.

The network congestion and reservation monitoring system monitors indications of the congestion of the communication network. The network congestion and reservation monitoring system may determine congestion metrics or measurements localized to regions, districts, zones, or specific end-to-end communication links based on analyzing the congestions indications. For example, in an embodiment, the network congestion and reservation monitoring system monitors explicit congestion notification (ECN) flags or information provided in data packet headers that are transported in the communication network. The explicit congestion notification information may be provided by router message queues, gateway message queues, base transceiver station message queues, enhanced Node B (eNB) message queues, and other message queues. In an embodiment, the explicit congestion notification information may indicate that a queue is now experiencing congestion, that a queue is close to experiencing congestion, that a queue in the recent past has experienced congestion, or other congestion conditions.

The network congestion and reservation monitoring system may analyze the explicit congestion notification information to estimate or model a congestion in the communication network. The network congestion and reservation monitoring system further estimates or models congestion in the communication network at a future time, for example 5 seconds in the future, 1 minute in the future, 10 minutes in the future, 1 hour in the future, or several hours in the future. The network congestion and reservation monitoring system may estimate or model congestion at a plurality of different time points and may refresh or recalculate these estimates or models periodically. In an embodiment, estimating and/or modeling congestion in the communication network takes into account the capacity of the communication network.

This modeling of the congestion of the network further may be based on historic information about communication network congestion. The historic information may include knowledge of the busy hour in the communication network on different days. Modeling of congestion of the network may also be based on schedules of equipment being brought into service and being taken out of service. The network congestion and reservation monitoring system may estimate and/or model network capacity and use an estimate or model of network capacity in modeling or estimating congestion. For example, congestion may be modeled as relatively increased when modeled network capacity is decreased, for example in anticipation of a maintenance event that takes a factional portion of the network out of service temporarily. Likewise, congestion may be modeled as relatively decreased when modeled network capacity is increased, for example in anticipation of bringing into service a new base transceiver station.

The network congestion and reservation monitoring system may also estimate or model demand for digital content delivery via network resources. As used herein, the term 'demand' refers to the demand for digital content delivery via the real-time brokering system or framework disclosed. For example, some time periods may be associated with increased or decreased demand for digital content delivery. Demand may be modeled or determined based on reservations of network resources for use in fulfilling digital content delivery offers, for example based on uncommitted reservations of network resources and committed reservations of network resources. Uncommitted and committed reservations are discussed further below. Demand may be modeled in part using probability distribution models or equations. Demand may be modeled in part based on event schedules that are somewhat decoupled from or weakly related to historic information. For example, demand may be increased after release of an electronic version of a new movie or in relationship to a blizzard. Demand may be increased on the release of a movie.

The modeling and/or determination of demand may further be based on uncommitted reservations of network resources and committed reservations of network resources. As used herein the term 'reservation,' both in the usage 'uncommitted reservation' and in the usage 'committed reservation,' does not refer to or mean an actual reservation of network capacity. As used herein, the term 'reservation,' 'uncommitted reservation,' and 'committed reservation' instead refers to a tool or mechanism for use in modeling and/or determining demand for digital content delivery based on real-time brokering of delivery offers.

When the network congestion and reservation monitoring system provides delivery options to the delivery offer and assurance manager it may create one or more uncommitted reservations of network resources. The reservations are uncommitted, because the user may not select a delivery offer associated with the uncommitted reservation. For example, the uncommitted reservation may define a 6 mbps data throughput for a 3 Gb sized file, but the user instead may select a 2 mbps data throughput or a best effort throughput for digital content delivery. The reservations are nonetheless a kind of reservation so that the potential use of the network resource can be taken into account when developing other delivery options, for example in response to check-out of other on-line shopping sessions. The uncommitted reservations may represent a boundary, a boundary box, or a window of potential network resources that correspond to the worst case delivery options. When the user selects a digital content delivery option, uncommitted resources may be released and/or destroyed. Some uncommitted reservations may be converted to committed reservations in response to the user selection of a digital content delivery offer.

In an embodiment, the network congestion and reservation monitoring system may define boundary boxes or boundary reservations associated with one or more digital content delivery requests. The boundary reservations may comprise an uncommitted reservation of resources associated with the worst case consumption of network resources associated with the several delivery options identified by the network congestion and reservation monitoring system. The boundary reservation may be defined based on the worst case of a number of different network resource parameters or according to a number of distinct dimensions of network resources. In an embodiment, a plurality of uncommitted reservations may be created, each uncommitted reservation directed to a worst case of one of the distinct dimensions of network resources associated with a plurality of digital content delivery offers or options.

The network congestion and reservation monitoring system builds delivery options based at least in part on modeling and/or estimating the network congestion and the demand. The network congestion and reservation monitoring system may further build delivery options based on analysis of the profile of the user and/or the location of the user and/or the radio access network portal associated with the user. For example, if the user profile indicates that the user often chooses to pay a premium for expedited digital content delivery, the network congestion and reservation monitoring system may provide relatively more delivery options of an expedited delivery type. The network congestion and reservation monitoring system may interwork with an access network discovery and selection function (ANDSF) to identify alternative content delivery networks, delivery paths, and/or radio access network portals via which to deliver the digital content to the communication device. One of ordinary skill in the art would appreciate that the access network discovery and selection function is an element in a 3GPP based network. For example, the network congestion and reservation monitoring system may determine though an interaction with the access network discovery and selection function that a Wi-Fi access point coupled to a video rental vending machine can provide a radio access network portal for delivering an item of digital content to the communication device, for example a mobile phone, while reducing the load on a congested base transceiver station that the communication device might otherwise receive delivery from.

The delivery offer and assurance manager receives the report identifying delivery options from the network congestion and reservation monitoring system and creates a number of candidate delivery offers and generates pricing for those candidate delivery offers. The pricing may vary depending upon the level of network congestion and/or depending upon the willingness of the user, determined based on the user's profile, to pay premium prices. Thus, a user identified as a relatively free spender may be provided with digital content delivery offers priced higher. Likewise, during periods of network congestion and/or of high demand for digital content delivery via the real-time brokering system, delivery content offers may be priced higher than they would be during periods of lower network congestion and/or during low demand. Alternatively, incentives for choosing deferred digital content delivery may be increased in value to more aggressively incent users to defer the delivery of their digital content until later, thereby reducing network congestion and/or promoting increasing the average margin on the use of the network resources by carrying a higher proportion of digital content delivery associated with upsell offers.

The delivery offer and assurance manager may select a relatively small number of candidate delivery offers and provide this selected set of delivery offers to the mobile phone or other communication device. Providing the selected set of delivery offers may be referred to as providing customized delivery offers. The delivery offers may be referred to as customized because they may be created or selected in view of a profile or history of the device 102, 122, based on a current network congestion, based on estimated and/or modeled demand, and based on network capacity. Thus, if different users or different network conditions or demand prevail, different customized offers may be built or created.

In an embodiment, the delivery offer and assurance manager may define boundary boxes or boundary reservations associated with one or more digital content delivery requests. The boundary reservations may comprise an uncommitted reservation of resources associated with the worst case consumption of network resources associated with the set of delivery offers. The boundary reservation may be defined based on the worst case of a number of different network resource parameters. The system may be provided by a single communication service provider or may promote interoperation among a plurality of different communication service providers.

Turning now to FIG. 1, a communication system 100 is described. In an embodiment, the system 100 comprises a mobile communication device 102 having a browser 104 or browser application. The system 100 may comprise a base transceiver station (BTS) 106, an enhanced Node B (eNB), a femtocell, or other cellular wireless communication access point. The base transceiver station 106 or other cellular wireless communication access point is coupled to the network 108 and may provide a wireless communication link to the mobile device 102 and may communicatively couple the mobile device 102 to the network 108. In some operation modes discussed further hereinafter, the mobile device 102 may receive a wireless communication link from and be communicatively coupled to the network 108 by another kind of wireless access point that is not a cellular communication access point, for example by a Wi-FI access point or by a Bluetooth access point. The network 108 comprises one or more public networks, one or more private networks, and/or a combination thereof. Portions of the network 108 may be provided by different communication service provider companies.

In an embodiment, at least some of the teachings of the present disclosure apply to a communication device 122 having a browser 124 that is communicatively coupled to the network 108 by a wired communication link. In some contexts, the communication device 122 may be said to receive digital content via a wired connection to the communication device 122. For example, the communication device 122 may be connected to one end of a communication cable and another end of the communication cable may be connected to a communication node, for example a hub, and the communication node may be coupled to the network 106 by a wired link. In an embodiment, the communication device 122 may be a desktop computer or a laptop computer, a tablet computer, or a notebook computer while coupled to a docking station.

In an embodiment, the system 100 further comprises an on-line market 110, a data store 112 containing digital content 114, a clearing house 116, a delivery offer and assurance manager (DOAM) 118, and a network congestion and reservation monitoring system (NORMS) 120. The on-line market 110 may comprise an electronic storefront or an on-line shopping web site that is provided by a server or computer system. The data store 112 may be implemented as one or more of a database, a lightweight directory access protocol (LDAP) server, or a file system. The data store 112 may be fronted or interfaced to the network 108 by a server and/or computer system that executes data access and/or database management system (DBMS) software. The clearing house 116 may be implemented by one or more applications that execute on a server and/or computer system. The delivery offer and assurance manager 118 may be implemented by one or more applications that execute on a server and/or computer system. The network congestion and reservation monitoring system 120 may be implemented by one or more applications executing on a computer system. Computer systems are described in more detail hereinafter.

The mobile communication device 102 may be a mobile phone, a personal digital assistant (PDA), or a media player. The mobile communication device 102 may be a wireless enabled laptop computer, notebook computer, or tablet computer. It is understood that the system 100 may comprise any number of mobile communication devices 102, communication devices 122, base transceiver stations 106, on-line markets 110, data stores 112, delivery offer and assurance managers 118, and network congestion and reservation monitoring systems 120.

In an exemplary use case, the mobile device 102 may be used to conduct on-line shopping in the on-line market 110. For example, the browser 104 may download a shopping web page from the on-line market 110 providing descriptions of merchandise available for purchase and providing controls to select and pay for purchased items. In a typical on-line shopping experience, the browser 104 may navigate through a plurality of web pages provided by the on-line market 110, for example a home page, a product catalog page, a shopping cart page, a checkout page, and other like on-line shopping web pages. As is known to those skilled in the art, navigating an on-line shopping web site may involve selecting a control button in a web page which causes the browser to retrieve a hypertext markup language (HTML) file that is then rendered by the browser to present a different web page. The hypertext markup language file may embed commands that are executed during rendering to fetch other content for presentation, for example by rendering a hypertext markup language IMAGE tag parameterized by a uniform resource locator (URL), a uniform resource identifier, and/or other reference information. The HTTP GET function retrieves content from the identified location, and the retrieved content, for example a graphic entity, may be presented in the browser window on the mobile device 102 or on the communication device 122. Other control buttons may activate other functions, for example committing a shopping purchase, transmitting payment information, and/or transmitting shipping information.

In an embodiment, the system 100 promotes building a variety of offerings for delivering purchased shopping items that comprise digital content 114 to the mobile device 102 or the communication device 122, for example music, video, electronic books, and other digital content stored in the data store 112. The digital content 114 may be stored in separate files. For example, a first file comprising a video, a second file comprising music. A file of digital content may comprise a plurality of related digital content, for example a high definition (HD) version of a movie, a digital version of the movie, alternative scenes associated with the movie, interviews with cast members or others associated with the making of the movie. The offerings may comprise a standard process for delivering digital content at no extra charge, a discounted process for delivering digital content at a deferred time in exchange for an incentive such as a coupon or a credit to an account balance of the user of the mobile device 102, and an accelerated process for delivering the digital content at an accelerated rate in exchange for an extra cost. The offerings are built in the context of both modeled communication network congestion and determined or modeled demand, for example demand based on both committed and uncommitted reservations of communication network resources. The system 100 promotes an improved utilization of the limited communication resources associated with the network 108, for example by allowing users to establish their own priorities among themselves and/or to cooperatively share the resources according to those priorities.

Figure 2:
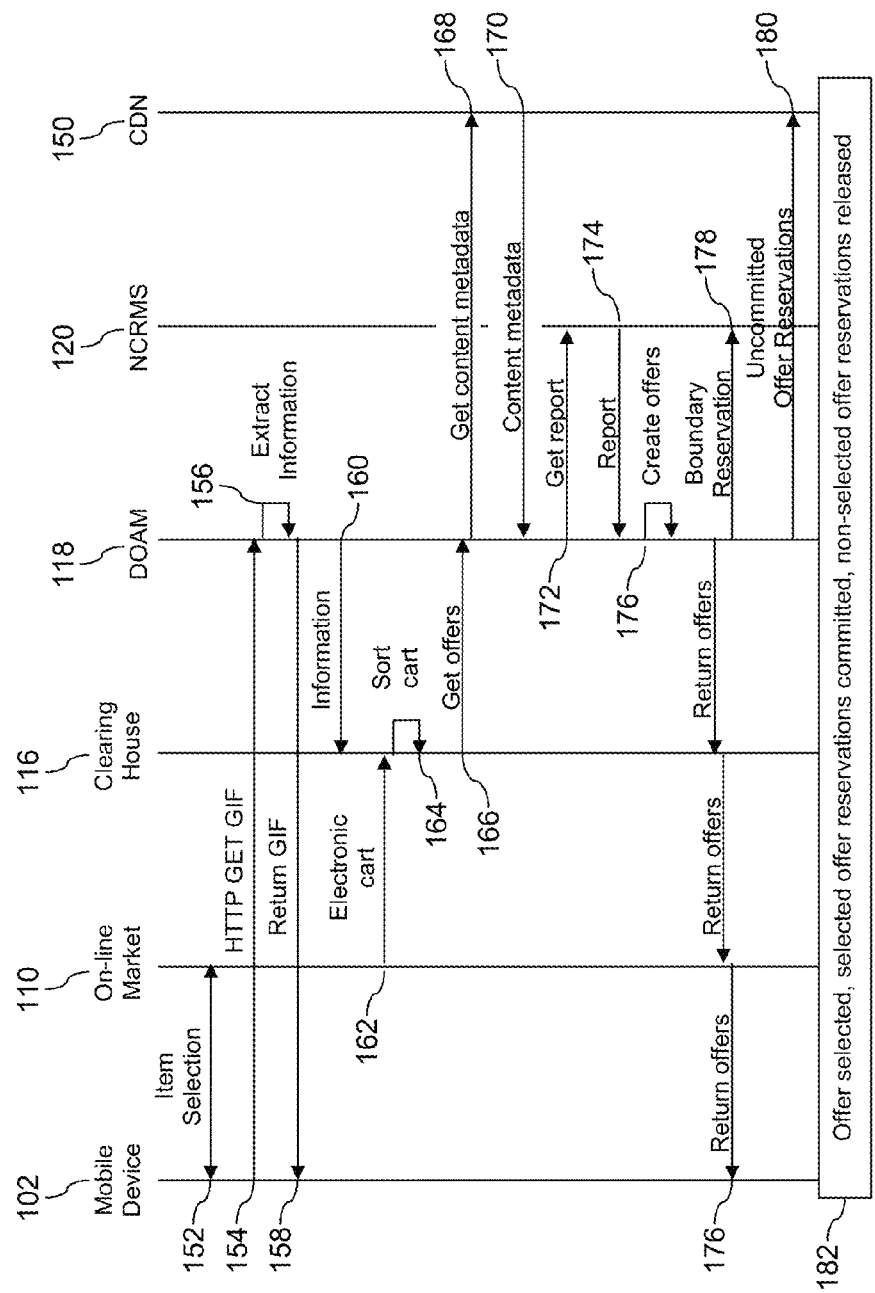
FIG. 2 is a message sequence diagram according to an embodiment of the disclosure.

Turning now to FIG. 2, a message sequence diagram of an exemplary on-line shopping experience is described. It is understood that the message sequence diagram represents a high level representation of the contemplated on-line shopping experience and digital content delivery. Some of the actions or message exchanges represented abstractly in FIG. 2 may be implemented in a variety of alternative approaches. Additionally, some actions may comprise a plurality of additional, constituent, and/or sub-actions not illustrated in FIG. 2 with a view to avoiding crowding of the message sequence diagram. Some of these alternatives and component actions are described further herein after.

At label 152 the mobile device 102 engages in an on-line shopping session with the on-line market 110, for example navigating an on-line shopping web site provided by the on-line market 110. It is understood that much of the processing and/or message represented in FIG. 2 would apply substantially to the communication device 122 engaged in an on-line shopping activity. The actions referenced by label 152 may comprise one or more messages sent from the mobile device 102 to the on-line market 110 and one or more messages sent from the on-line market 110 to the mobile device 102. The actions may be associated with navigating the on-line market 110 shopping web site, placing shopping items in an electronic shopping cart, and proceeding to a checkout web page.

In an embodiment, when the mobile device 102 selects and the browser 104 renders the checkout web page, a hypertext markup language (HTML) tag, for example an HTML IMAGE tag, is encountered in the checkout web page HTML, and in response the mobile device 102 sends a hypertext transport protocol (HTTP) GET message 154 that references a graphics interchange format (GIF) file. It is understood that the HTML IMAGE tag could be embedded in other pages of the on-line shopping web site, and that rendering the HTML IMAGE tag may result in the HTTP GET message being transmitted at a different time during the on-line shopping process, for example when the user first navigates to the shopping web site, when the user first navigates to a product page, or other page. In an embodiment, the HTML IMAGE tag may be embedded only in pages that comprise digital content items. Also, while the process described with reference to FIG. 2 speaks of a HTTP GET message referencing a graphics interface format (GIF) file, it is understood that the HTTP GET message may reference other image files such as a JPEG or other image file. Additionally, in an embodiment, at least some of the benefits of sending the HTTP GET message may be realized by an HTTP GET message that references non-image files, possibly any file type. Additionally, in an embodiment an HTTP PUT message or a HTTP POST message may be sent instead of or in addition to the HTTP GET message.

The HTTP GET message may be transmitted first to the on-line market 110, and the on-line market 110 may bind merchant information to the HTTP GET message before forwarding the HTTP GET message on to the clearing house 116 and/or to the delivery offer and assurance manager 118. The merchant information may comprise a merchant identifier associated with the specific on-line market 110 and a transaction identifier that is associated with the current shopping session established between the mobile device 102 and the on-line merchant 110.

The HTTP GET message may comprise contextual information such as an identity of a wireless communication network service provider that is the primary carrier associated with the mobile device 102. The HTTP GET message may comprise the internet protocol address of and/or a communication gateway associated with the mobile device 102, from which the wireless communication network service provider can be deduced. Additionally, based on the internet protocol address and/or the identity of the gateway associated with the mobile device 102, the delivery offer and assurance manger 118 may be able to infer that the mobile device 102 is served by a 3G wireless protocol or a 4G wireless protocol. The HTTP GET message may comprise contextual information such as an identity of an operating system of the mobile device 102, an identity of the model of the mobile device 102, an identity of the subscriber and/or user associated with the mobile device 102, and/or other contextual information. From the model of the mobile device 102, the delivery offer and assurance manager 118 and/or the network congestion and reservation monitoring system 120 may infer a maximum bit rate and/or a display resolution of the mobile device 102. The HTTP GET message further may encapsulate information about congestion of the network 108, for example the HTTP GET message may encapsulate explicit congestion notification (ECN) bits or flags that may convey information about the congestion of the specific end-to-end communication link from the mobile device 102 to the clearing house 116 or to the delivery offer and assurance manager 118.

At label 156 the delivery offer and assurance manager 118 extracts the contextual information and/or other information from the HTTP GET message and returns the requested GIF or other file to the mobile device 102. The GIF may be returned in message 158 to the mobile device 102 directly or indirectly. For example, the GIF may be returned to the clearing house 116, the clearing house 116 may return the GIF to the on-line merchant 110, and the on-line merchant 110 may return the GIF to the mobile device 102. The mobile device 102 renders the GIF in the checkout web page presented in the browser window. In message 160 at least some of the contextual information extracted from the HTTP GET message is transmitted to the clearing house 116.

In an embodiment, if the delivery offer and assurance manager 118 is unable to identify a primary carrier associated with the mobile device 102 based on the information extracted from the HTTP GET message or if the primary carrier is not affiliated with the digital content delivery system mediated by the clearing house 116, a transparent GIF is returned to the mobile device 102. When the mobile device 102 renders the transparent GIF in the checkout web page, the checkout page is presented unchanged. If the primary carrier is identified as affiliated with the digital content delivery system mediated by the clearing house 116, a normal GIF is returned to the mobile device 102. When the mobile device 102 renders the normal GIF, an image or icon associated with the digital content delivery system mediated by the clearing house 116 may be presented in the checkout web page presented in the browser window. It is contemplated that in some circumstances, for example if the mobile device 102 is a low performance device, a transparent GIF may be returned even when the primary carrier of the mobile device 102 is affiliated with the digital content delivery system mediated by the clearing house 116. Under this circumstance, it may be thought that the subject low performance mobile device 102 may be incapable of providing the premium delivery of digital content that may be desirably associated with the digital content delivery system.

It is noted that the delivery offer and assurance manager 118 may extract the contextual information from the HTTP GET message early in the checkout interaction. The delivery offer and assurance manager 118 may perform analysis based on the contextual information to support building offers for digital content delivery as the checkout interaction proceeds. Initially, the user may be adjusting the content of the electronic shopping cart, for example increasing or decreasing quantities, inputting and/or confirming payment options. By performing preliminary analysis the delivery offer and assurance manager 118 may improve the user on-line shopping experience by reducing delays in providing alternative digital content delivery offers to the checkout window. To support earlier access to the contextual information, in different embodiments, the HTML IMAGE tag may be embedded in different web pages of the on-line shopping site, for example in the home page, in a product research page, in a shopping cart interaction page, or other page.

At the same time that the HTTP GET requesting the GIF was transmitted, a copy of the electronic shopping cart may be transmitted to the clearing house 116, for example, in message 162 the on-line market 110 may transmit a copy of the contents of the electronic shopping cart to the clearing house 116. The purchase items in the electronic shopping cart may comprise a wide variety of items. Some of the purchase items may be hardware items such as a lamp, a set of dishes, or other like hardware items. Some of the purchase items may comprise digital content, for example music content, video content, electronic book content, or like digital content. If one or more items of digital content are in the electronic shopping cart, the clearing house 116 obtains a plurality of digital content delivery offers and return these offers to the mobile device 102 directly or indirectly for display in the checkout web page.

At label 164 the clearing house 116 sorts the electronic shopping cart to identify a list of digital content items in the electronic shopping cart. If the electronic shopping cart contains any digital content items, the clearing house 116 sends a get offer message 166 to the delivery offer and assurance manager 118 with the list of digital content items. The delivery offer and assurance manager 118 builds or creates a plurality of offers and returns these offers to the clearing house 116, and the clearing house 116 returns these offers to the mobile device 102. The offers for delivery may be items added into the electronic shopping cart. If there are no digital content items in the electronic shopping cart, the electronic shopping cart may be returned unchanged to the on-line market 110 and/or the mobile device 102.

It is understood that a variety of different scenarios of building the digital content delivery offers are contemplated by the present disclosure. Some of the different scenarios are triggered by different states or conditions in the system 100. Some of the different scenarios correspond to alternative embodiments of one or more components of the system 100.

In response to the get offer message 166, the delivery offer and assurance manager 118 sends a get content metadata message to a content delivery network 150. The content delivery network 150 may be considered to be part of the network 108. The content delivery network 150 may comprise a variety of communication network resources including wired network resources and wireless network resources. The content delivery network 150 may be conceptualized to provide an end-to-end communication link from the digital content 114 stored in the content data store 172 to the mobile device 102 or to the communication device 122. This end-to-end communication link may comprise routers, gateways, and the base transceiver station 106. Each of the nodes in the end-to-end communication link may use message queues for receiving and sending messages, for example packet messages comprising portions of the digital content to be delivered to the mobile device 102 or the communication device 122. The content delivery network 150 may comprise a mix of network infrastructure operated by different communication service providers. The content delivery network 150 may comprise different access network paths.

The content delivery network 150 obtains metadata about the subject digital content 114, for example metadata identifying a size in bytes of the digital content, a type of digital content, and/or a play time of the digital content and returns the content metadata to the delivery offer and assurance manager 118 in message 170. In some contexts the metadata may be referred to as a manifest or may be encapsulated with the digital content as a manifest. The manifest may be stored and/or encapsulated at the start and/or at the end of the digital content 114. If the list of digital content items provided to the delivery offer and assurance manager 118 by the clearing house 116 comprises a plurality of digital content items, the delivery offer and assurance manager 118 and the content delivery network 150 may repeat the messages 168, 170 for each of the digital content items.

The delivery offer and assurance manager 118 sends a get report message 172 to the network congestion and reservation monitoring system 120, and the network congestion and reservation monitoring system 120 returns a report in message 174. The get report message 172 may comprise a variety of information such as a location of the mobile device 102, for example a serving base transceiver station 106, a serving gateway, and/or other network location information. If known, information about type or grade of digital content delivery desired may be provided.

The network congestion and reservation monitoring system 120 models congestion of the network 108 and/or the content delivery network 150 based on any of historical congestion information and/or based on current measurements of network congestion, for example by monitoring explicit congestion notification (ECN) bits or flags in packets. Network congestion may also be referred to as network traffic load. The network congestion and reservation monitoring system 120 may be said to act like a call admission control success predictor, to monitor network usage to predict if a future request to use network resources will be rejected.

Explicit congestion notification information may be conceptualized as an advanced warning system, a leading indicator that some pathways in the network 108 are approaching traffic saturation. The explicit congestion notification information may be analyzed by the network congestion and reservation monitoring system 120 to determine a magnitude and approximate location of congestion in the network 108. Analysis of explicit congestion notification information and/or other information by the network congestion and reservation monitoring system 120 may promote determining that the main source of congestion is located in the mobile device 102 itself, in the radio access network (RAN), or elsewhere. Explicit congestion notification information may be provided by a variety of network nodes such as gateways, routers, the base transceiver station 106, the mobile device 102, the communication device 122, or other communication nodes. The explicit congestion information may be based on handling of messages in message queues in the subject nodes.

The network congestion and reservation monitoring system 120 may further create and maintain uncommitted reservations of network resources and committed reservations of network resources. The network congestion and reservation monitoring system 120 may age the uncommitted reservations and delete uncommitted reservations that exceed a predefined lifetime, for example a life time of about 30 seconds, a lifetime of about 1 minute, a lifetime of about 2 minutes, a lifetime of about 5 minutes, or some other predefined lifetime. In an embodiment, the lifetime may dynamically adapt based on current demand and/or congestion. The network congestion and reservation monitoring system 120 may determine demand based on the uncommitted and committed reservations. The network congestion and reservation monitoring system 120 may further track and/or take into consideration network capacity, where it is understood that network capacity may change over time in response to maintenance events, outage events, new equipment being placed into service, and old equipment being removed from service.

Additionally, the network congestion and reservation monitoring system 120 may obtain information about alternative wireless access networks from an access network discovery and selection function (ANDSF). The access network discovery and selection function may comprise a series of extensible markup language (XML) documents or documents formatted in a different manner that comprise user access policies. The access network discover and selection function may identify a Wi-Fi access point or a Bluetooth access point that may be available for delivering the digital content 114. Alternatively, the access network discovery and selection function may identify other cellular radio access networks, for example a worldwide interoperability for microwave access (WiMAX) base transceiver station that may be available for delivering the digital content 114.

The network congestion and reservation monitoring system 120 develops the report based on analyzing the information available to it, for example any of the information described above. The report comprises information about relevant communication network congestion, network topology and/or end-to-end paths, and bandwidth usage options. The network congestion and reservation monitoring system 120 may perform at least some of the analysis based on providing digital content delivery at different times, for example an hour in the future, four hours in the future, a day in the future, or several days in the future.

The network congestion and reservation monitoring system 120 may create reservations of network communication resources based on the content delivery options that the report describes. It is to be noted that the reservations created by the network congestion and reservation monitoring system 120 may be considered uncommitted reservations until the user of the mobile device 102 or the communication device 122 commits to the subject delivery option. In an embodiment, the network congestion and reservation monitoring system 120 may identify content delivery options based on overloading and/or overbooking uncommitted reservations of network resources, based on the expectation that statistically not all of the uncommitted reservations would be committed. In an embodiment, the percentage of overloading of uncommitted reservations may be configurable by an administrator without restarting the network congestion and reservation monitoring system 120. Alternatively, the percentage of overloading of uncommitted reservations may automatically adapt dynamically based on a rate of failure of fulfilling the offered digital content delivery. The process of overbooking based on uncommitted reservations may be conceptualized as derating uncommitted reservations, for example derating an uncommitted reservation at 60% of the associated network resources based on the assumption that only about 60% of the associated digital content delivery offers are accepted by users.

In an embodiment, it may be desirable for the network 108 to be operated at an 80% to 90% utilization rate and to favor an increased proportion of high margin (premium priced) digital content delivery relative to low margin delivery. In an embodiment, the network congestion and reservation monitoring system 120 identifies content delivery options in the context of these decision rules. By offering a suitable balance of incentives for deferring content delivery to later time periods, for example well after the busy hour has passed and premium pricing for enhanced quality of service content delivery, the network congestion and reservation monitoring system 120 and/or the delivery offer and assurance manager 118 may train users of the mobile device 102 and/or of the communication device 122 to use the network resources 108 more efficiently. If a first user is willing to defer delivery of a first digital content for four hours, this may free the resources to support expedited delivery of a second digital content to a second user who is leaving on a plane in 20 minutes and is willing to pay a premium price for expedited delivery. According to one way of analyzing this situation, a greater good may be served by this distribution than if the first user, who doesn't care about the timing, gets his first digital content delivered immediately while the second user fails to receive his second digital content before his plane takes off and instead has to read the airline flight magazine.

In an embodiment, uncommitted reservations have a maximum life or time duration and are deleted after the expiration of the maximum life or time duration. The maximum life may be about 30 seconds, about 1 minute, about 2 minutes, or some other relatively short time duration. The maximum life or time duration may be predefined based on allowing sufficient time to the user of the mobile device 102 or the communication device 122 to choose a preferred digital content delivery offering while not tying up communication network resources indefinitely. In an embodiment, the maximum life and/or time duration of uncommitted reservations may dynamically vary based on the demand and/or congestion of the network 108. For example, when the network 108 is lightly loaded, the maximum life of uncommitted reservations may be defined to be a relatively longer time period, and when the network 108 is heavily loaded, the maximum life of uncommitted reservations may be defined to be a relatively shorter time period.

The network congestion and reservation monitoring system 120 may provide one or more session description protocol (SDP) messages having a parameter that indicates a sense of change of a quality of service relative to a best effort delivery or an over-the-top (OTT) quality of service which could be considered a nominal or baseline quality of service. The parameter may indicate a "bump" in quality of service and a magnitude of the change. The change can be a decrease, for example when the subject delivery option is based on deferred digital content delivery. The delivery offer and assurance manager 118 may use the session description protocol message parameter to develop pricing for a digital content delivery offer.

When the delivery offer and assurance manager 118 receives the report 174, it analyzes the report. Based on this analysis, based on any known delivery preferences of the user of the mobile device 102 or the communication device 122, based on busy hour rules, the delivery offer and assurance manager 118 generates a plurality of candidate digital content delivery offers. The digital content delivery offers provide pricing and/or incentives along with a specific delivery plan or order. The delivery offer and assurance manager 118 may store candidate digital content delivery offers as well as data for outstanding or active communication network services that have not completed.

The number of candidate offers may be relatively large, for example 15 candidate offers, 20 candidate offers, 25 candidate offers, or more. It may be that a typical user might be confused when asked to select from a large number of candidate offers. In an embodiment, the delivery offer and assurance manager 118 may prune the candidate offers to a more manageable number of digital content offers that may be provided to the user, for example from 3 digital content delivery offers to 7 digital content delivery offers. In an embodiment, a control may be presented to the user of the mobile device 102 or the communication device 122 to select additional digital content delivery offers, thereby allowing the user to consider a greater number of delivery offers if that is his or her preference. The digital content delivery offers that are presented to the user of the mobile device 102 or of the communication device 122 may comprise a concise non-technical description of the delivery offer and a price or incentive. For example, the offer presentation may specify "double time" or "half the typical time" delivery. The offer presentation may specify "deliver later."

A variety of strategies for pruning the candidate offers may be employed. One strategy may be to provide one default digital shipping offer that entails no extra cost to the user, a premium digital shipping offer that includes a $2 fee for delivering the subject digital content in half the customary time, and an economy digital shipping offer that offers a coupon or $1 credit to an account balance of the user in exchange for deferring the delivery of their purchased digital content until two hours in the future, after an approaching busy hour in the network 108. As is known to those skilled in the art, the busy hour of a communication network is the hour during the day when the highest volume of communication traffic and/or network congestion can be expected. The hour that is busiest may be different for different days of the week. Additionally, days that are holidays may have different hours that are busiest, for example Mothers' Day, Christmas Day, or other holidays. The busy hour may be identified as any approximately 60 minute time interval in the day, not necessarily starting and ending on the hour. For example, the busy hour may extend from 4:40 PM to 5:40 PM (or 5:39 PM) on a typical Wednesday. The busy hour may occur at different times in different portions of the network, for example in portions of the network located in different time zones. For example, the busy hour may extend from 4:40 PM EST to 5:39 PM EST in the eastern time zone, from 5:40 PM EST to 6:39 PM EST in the central time zone, from 6:40 PM EST to 7:39 PM EST in the mountain time zone, and from 7:40 PM EST to 8:39 PM EST in the pacific time zone.

Another strategy may be to provide alternative radio access network connections at a specified price, for example a download via a Wi-Fi access point or a Bluetooth access point at a known media outlet, for example at a vending machine for distributing movie disks that is provided with a Wi-Fi access point and connectivity to the network 108. In an embodiment, this delivery offering may take into account a driving time of a user of the mobile device 102 to drive to the subject media outlet based on a current location of the mobile device 102 based on GPS coordinates provided by the mobile device 102 or based on the location of the known current serving base transceiver station 106. Another strategy may be applied when the electronic shopping cart includes two or more items of digital content, where a price may be offered based on delivering a preferred item of digital content as soon as possible while deferring delivery of the other items of digital content at a later time. The user may provide an indication of a preferred order of digital content delivery, or this preference may be inferred from other available information, such as a user profile.

It is contemplated that a wide variety of pruning strategies may be implemented by the delivery offer and assurance manager 118. The delivery offer and assurance manager 118 may prune offers and/or options based on a maximum bit rate and/or display screen resolution of the model of the mobile device 102. The delivery offer and assurance manager 118 may take into account a known history of user behavior in addition to context cues such as a location of the user. If the user flies out of a specific airport once per month on a 4 hour flight during the second week of the month, the current time is the second week of the month, and the location of the mobile device 102 is consistent with driving to the airport, the delivery offer and assurance manager 118 may prune the candidate offers based on the conjecture that the user of the mobile device 102 is preparing to leave town on a 4 hour flight. The delivery offer and assurance manager 118 may further adapt the pricing of the candidate offers based on a history and/or profile of the user of the mobile device 102. For example, if the user frequently chooses a premium delivery of digital content immediately prior to and during a plane trip, the candidate offers may be pruned to contain more premium offers and the pricing may be adapted to a higher price scale. If the user customarily purchases a movie digital content on Friday evenings and has often selected expedited digital delivery, a plurality of expedited digital delivery options may be provided at different premium price points.

When the network 108 and/or the content delivery network 150 is lightly loaded, the delivery offer and assurance manager 118 may prune the candidate offers so as to provide more high data rate offers, possibly at a relatively lower price. Alternatively, when the network 108 and/or the content delivery network 150 is lightly loaded the delivery offer and assurance manager 118 may provide only a single standard best effort delivery offer. It is to be noted that providing best effort delivery for digital content does not imply slow or uncertain delivery of the subject digital content, particularly when the network 108 and/or the content delivery network 150 is lightly loaded.

In an embodiment, the delivery offer and assurance manager 118 may employ a "top down" delivery offer strategy that may enhance the chances of successful upsell events. For example, the delivery offer and assurance manager 118 may always or frequently, based on profile information, offer at least one maximum upsell offer. The maximum upsell offer may be defined as a predefined percentage of the available bandwidth. The available bandwidth may be determined as the difference between a network capacity and the sum of the network congestion and the demand. Said in a different way, the available bandwidth may be determined as the difference between a network capacity and the sum of the current network traffic load and the current demand.

For example, one offer may be to provide 30% of the bandwidth available to the subject device 102, 122 for a charge of $4. As an example scenario, suppose the available bandwidth is determined to be 20 mbps. A first user may be offered an upsell offer of 30% of that 20 mbps or 6 mbps for an upsell charge of $4. The available bandwidth may be considered to be 14 mbps after this first offer is made (assuming no overbooking of uncommitted reservations). A second user may be offered an upsell offer of 30% of that 14 mbps or 4.2 mbps for an upsell charge of $4. The available bandwidth may be considered to be 9.8 mbps after this second offer is made. A third user may be offered an upsell offer of 30% of that 9.8 mbps or about 3 mbps for an upsell charge of $4. The available bandwidth may be considered to be about 6.8 mbps after this third offer is made. Suppose the first user declines the upsell offer of 6 mbps and instead commits to a 2 mbps digital content delivery offer. At this point the available bandwidth is determined to be 10.8 mbps. Note that the example pricing scenario above promotes increased margin on bandwidth as demand and/or congestion increases. This may be referred to in some contexts as real-time dynamic pricing.

The delivery offer and assurance manager 118 may select from the candidate offers that correspond to qualitative classes of quality of service. For example, a "platinum" class of offer may be selected that corresponds to a first predefined percentage of available bandwidth on a given path to the device 102, 122, where the available bandwidth excludes in-use, uncommitted reserved, and/reserved network resources. The "platinum" class of offer may be priced at the highest rate or at the highest surcharge over an unlimited data subscription plan. A "gold" class of offer may be selected from the candidate offers that corresponds to a second predefined percentage of available bandwidth (less than the bandwidth associated with the "platinum" offer). The "gold" class of offer may be priced as a lower rate or a lower surcharge over the unlimited data subscription plan. For example, a platinum offer may offer 10% of available bandwidth of the base transceiver station 106, and a gold offer may offer 5% of the available bandwidth of the base transceiver station 106. Alternatively, the platinum offer may offer 20% of the available bandwidth of the base transceiver station 106, and the gold offer may offer 10% of the available bandwidth of the base transceiver station 106.

In an embodiment, the percentage of available bandwidth associated with platinum offers and gold offers may not be predefined but may vary with the demand and/or congestion in the network 106. While two different classes of offers were described above, it is understood that any number of classes of offers may be promoted by the system 100.

The delivery offer and assurance manager 118 sends a small number of digital content delivery offers in message 176 directly or indirectly to the mobile device 102 or to the communication device 122. For example, the delivery offer and assurance manager 118 sends the small number of digital content delivery offers to the clearing house 116, and the clearing house 116 places the small number of digital content delivery offers in the electronic shopping cart and returns the shopping cart to the mobile device 102 or the communication device 122. The delivery offer and assurance manager 118 also determines a maximum set of resource consumption associated with the small number of offers to define a boundary reservation 178 and sends the boundary reservation 178 to the network congestion and reservation monitoring system 120. At block 182, the user of the mobile device 102 or the communication device 122 selects a digital content delivery offer, communication network resource reservations associated with the selected delivery offer are committed in the content delivery network 150, and uncommitted reservations 180 and/or boundary reservations 178 are released. In some circumstances an uncommitted reservation may be converted from uncommitted to committed if appropriate.

When the device 102, 122 selects a digital content delivery offer, a session description protocol (SDP) message may be generated describing the subject digital content delivery offer, the digital content delivery service level agreement, or digital content delivery quality of service. The session description protocol message may be sent to the content delivery network and to a long term evolution network. The long term evolution network may build policies and set up network gateways and/or an enhanced Node B to establish the content delivery path.

It is contemplated that some of the functions described above as being performed by different computer systems or servers may be combined on one computer system or server. For example, in an embodiment, the functions of the clearing house 116 and the functions of the delivery offer and assurance manager 118 may be combined in a single server or computer system. In an embodiment, the functions of the network congestion and reservation monitoring system 120 and the access network discovery and selection function may be combined in a single server or computer system.

In embodiment, some of the digital content 114 may be delivered to the mobile device 102 over an end-to-end trusted communication infrastructure supported by network nodes having trusted security zones. A trusted security zone provides chipsets with a hardware root of trust, a secure execution environment for applications, and secure access to peripherals. A hardware root of trust means the chipset should only execute programs intended by the device manufacturer or vendor and resists software and physical attacks, and therefore remains trusted to provide the intended level of security. The chipset architecture is designed to promote a programmable environment that allows the confidentiality and integrity of assets to be protected from specific attacks. Trusted security zone capabilities are becoming features in both wireless and fixed hardware architecture designs. Providing the trusted security zone in the main mobile device chipset and protecting the hardware root of trust removes the need for separate secure hardware to authenticate the device or user. To ensure the integrity of the applications requiring trusted data, such as a mobile financial services application, the trusted security zone also provides the secure execution environment where only trusted applications can operate, safe from attacks. Security is further promoted by restricting access of non-trusted applications to peripherals, such as data inputs and data outputs, while a trusted application is running in the secure execution environment. In an embodiment, the trusted security zone may be conceptualized as hardware assisted security.

A complete trusted execution environment (TEE) may be implemented through the use of the trusted security zone hardware and software architecture. The trusted execution environment is an execution environment that is parallel to the execution environment of the main mobile device operating system. The trusted execution environment and/or the trusted security zone may provide a base layer of functionality and/or utilities for use of applications that may execute in the trusted security zone. For example, in an embodiment, trust tokens may be generated by the base layer of functionality and/or utilities of the trusted execution environment and/or trusted security zone for use in trusted end-to-end communication links to document a continuity of trust of the communications. For more details on establishing trusted end-to-end communication links relying on hardware assisted security, see U.S. patent application Ser. No. 13/532,588, filed Jun. 25, 2012, entitled "End-to-end Trusted Communications Infrastructure," by Leo Michael McRoberts, et al., which is hereby incorporated by reference in its entirety. Through standardization of application programming interfaces (APIs), the trusted execution environment becomes a place to which scalable deployment of secure services can be targeted. A device which has a chipset that has a trusted execution environment on it may exist in a trusted services environment, where devices in the trusted services environment are trusted and protected against attacks. The trusted execution environment can be implemented on mobile phones and tablets as well as extending to other trusted devices such as personal computers, servers, sensors, medical devices, point-of-sale terminals, industrial automation, handheld terminals, automotive, etc.

The trusted security zone is implemented by partitioning all of the hardware and software resources of the mobile device into two partitions: a secure partition and a normal partition. Placing sensitive resources in the secure partition can protect against possible attacks on those resources. For example, resources such as trusted software applications may run in the secure partition and have access to hardware peripherals such as a touchscreen or a secure location in memory. Less secure peripherals such as wireless radios may be disabled completely while the secure partition is being accessed, while other peripherals may only be accessed from the secure partition. While the secure partition is being accessed through the trusted execution environment, the main mobile operating system in the normal partition is suspended, and applications in the normal partition are prevented from accessing the secure peripherals and data. This prevents corrupted applications or malware applications from breaking the trust of the device.

The trusted security zone is implemented by partitioning the hardware and software resources to exist in a secure subsystem which is not accessible to components outside the secure subsystem. The trusted security zone is built into the processor architecture at the time of manufacture through hardware logic present in the trusted security zone which enables a perimeter boundary between the secure partition and the normal partition. The trusted security zone may only be manipulated by those with the proper credential and, in an embodiment, may not be added to the chip after it is manufactured. Software architecture to support the secure partition may be provided through a dedicated secure kernel running trusted applications. Trusted applications are independent secure applications which can be accessed by normal applications through an application programming interface in the trusted execution environment on a chipset that utilizes the trusted security zone.

In an embodiment, the normal partition applications run on a first virtual processor, and the secure partition applications run on a second virtual processor. Both virtual processors may run on a single physical processor, executing in a time-sliced fashion, removing the need for a dedicated physical security processor. Time-sliced execution comprises switching contexts between the two virtual processors to share processor resources based on tightly controlled mechanisms such as secure software instructions or hardware exceptions. The context of the currently running virtual processor is saved, the context of the virtual processor being switched to is restored, and processing is restarted in the restored virtual processor. Time-sliced execution protects the trusted security zone by stopping the execution of the normal partition while the secure partition is executing.

The two virtual processors context switch via a processor mode called monitor mode when changing the currently running virtual processor. The mechanisms by which the processor can enter monitor mode from the normal partition are tightly controlled. The entry to monitor mode can be triggered by software executing a dedicated instruction, the Secure Monitor Call (SMC) instruction, or by a subset of the hardware exception mechanisms such as hardware interrupts, which can be configured to cause the processor to switch into monitor mode. The software that executes within monitor mode then saves the context of the running virtual processor and switches to the secure virtual processor.

The trusted security zone runs a separate operating system that is not accessible to the device users. For security purposes, the trusted security zone is not open to users for installing applications, which means users do not have access to install applications in the trusted security zone. This prevents corrupted applications or malware applications from executing powerful instructions reserved to the trusted security zone and thus preserves the trust of the device. The security of the system is achieved at least in part by partitioning the hardware and software resources of the mobile phone so they exist in one of two partitions, the secure partition for the security subsystem and the normal partition for everything else. Placing the trusted security zone in the secure partition and restricting access from the normal partition protects against software and basic hardware attacks. Hardware logic ensures that no secure partition resources can be accessed by the normal partition components or applications. A dedicated secure partition operating system runs in a virtual processor separate from the normal partition operating system that likewise executes in its own virtual processor. Users may install applications on the mobile device which may execute in the normal partition operating system described above. The trusted security zone runs a separate operating system for the secure partition that is installed by the mobile device manufacturer or vendor, and users are not able to install new applications in or alter the contents of the trusted security zone.

In an embodiment, some of the functionality for building digital content custom delivery offers may be used when a client application on the mobile device 102 or the communication device 122 accesses a file or launches a uniform resource indicator (URI). For example, a graphical user interface (GUI) may be displayed prompting the user to select one of multiple digital content delivery options. One option may be an accelerator button or expediting button that selects high speed digital content delivery. The accelerator button may not be linked to a determination or modeling of the ability of the network to successfully fulfill a specific quality of service and may be referred to as a blind offer. The accelerator button may not be presented during periods of congestion in the network 108 or during the busy hour of the network 108. Alternatively, the graphical user interface may provide controls to select customized digital content delivery offers based on the offer creation and/or building functionality described further above.

In an embodiment, the user of the device 102, 122 may be able to register intents associated with actions. For example, the user may register an intent associated with launching a video application or video media player on the device 102, 122, where the intent brings up the graphical user interface to promote selecting from a variety of customized delivery offers. For example, the user may register an intent associated with launching a URI, such as a URI referencing a video content provider, where the intent brings up the graphical user interface to promote selecting from a variety of customized delivery offers.

Figure 3:
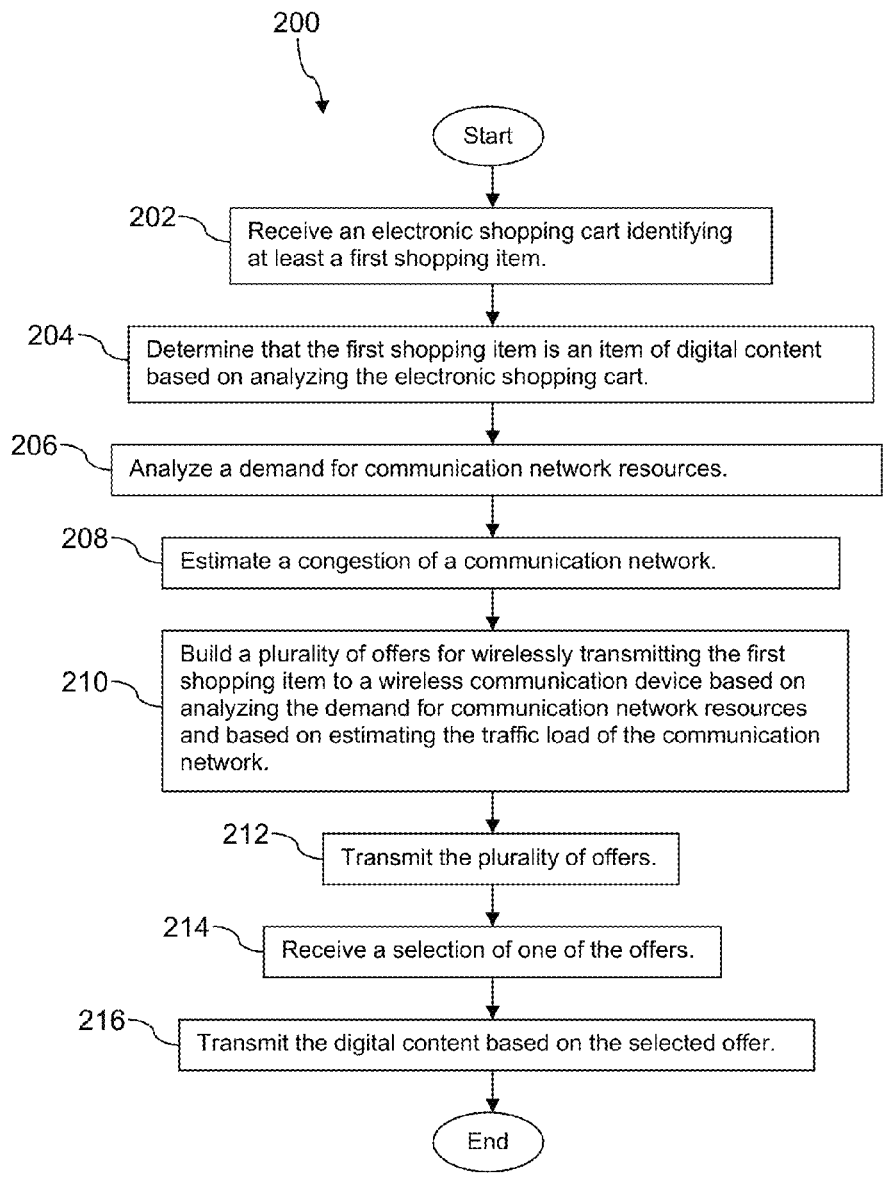
FIG. 3 is a flow chart of a method according to an embodiment of the disclosure.

Turning now to FIG. 3, a method 200 is described. At block 202, an electronic shopping cart identifying at least a first shopping item is received. It is understood that the electronic shopping cart may be a data or message based representation of an electronic shopping cart enabled by on-line shopping software or web pages. The electronic shopping cart received may be a copy of the electronic shopping cart that an on-line shopper interacts with. The electronic shopping cart may include a number of items added to the shopping cart by a user of the mobile device 102 or of the communication device 122, for example hardware items and/or digital content items.

At block 204, the first shopping item is determined to be an item of digital content based on analyzing the electronic shopping cart. The item may be determined to be digital content based on a tag or parameter specifying digital content in the data representation of the first shopping item encapsulated in the electronic shopping cart. Alternatively, the item may be determined to be digital content by looking the item up in a comprehensive catalog of shopping items associated with the on-line market 110 and determining from the subject entry in the catalog that the item is digital content.

At block 206, a demand for communication network resources is analyzed. The demand may be analyzed or projected based on historical demand data, for example the usage of communication resources recorded in logs or metrics. The demand may further be analyzed based on calculations of the probability of different demand scenarios occurring based on a recent demand trend, for example a demand trend over the previous ten minutes or the previous hour. The demand may also be analyzed or projected based on uncommitted and/or committed reservations of network resources.

At block 208, a traffic load or congestion of the communication network is estimated or modeled. It is understood that the traffic load or congestion referred to here is may not be restricted to the current traffic load in the network 108 but may also comprise the projected, estimated, or modeled traffic load or congestion at a future point in time when a digital content delivery offer may be fulfilled. This future point in time may be five seconds in the future, ten minutes in the future, an hour in the future, or several hours in the future. In any case, to promote delivery of the quality of service that may be offered to the user of the mobile device 102 or the communication device 122, it may not be sufficient to merely take the current traffic load or congestion in the network 108 and assume this state will prevail when the offered digital content delivery is fulfilled. The traffic load or congestion may further be modeled based on recent traffic loads and/or knowledge of diurnal traffic load trends. The traffic load or congestion may further be modeled based on collection of explicit congestion notification data from nodes in the network 108 and based on analysis of the explicit congestion notification to identify where message queues may be stressed and struggling to support robust delivery of data.

At block 210, a plurality of offers for transmitting the first shopping item to a wireless communication device based on analyzing the demand for communication network resources and based on estimating the traffic load of the communication network are built or created. The offers may be created by first generating a relatively large pool of candidate offers and then pruning or reducing the candidate offers to a relatively small number of offers to be transmitted. The offers may differ along independent parameters, for example differ according to a nominal data rate, differ according to a radio access network portal, and/or differ according to a type of delivery. For example, the delivery rate may comprise 5 mbps data rate, a 2 mbps data rate, or a 1 mbps data rate. For example, the radio access network portal may be a Wi-Fi access point coupled to a video rental vending machine, a WiMAX base transceiver station, or a Bluetooth kiosk in an electronic retail store. For example, the delivery types may include a deferred delivery type, an expedited delivery type, an as-soon-as-possible delivery type, an assured delivery type, and a best effort delivery type.

At block 212, the plurality of offers is transmitted. For example, the plurality of offers is transmitted directly or indirectly to the clearing house 116, to the on-line market 110, and/or to the mobile device 102. The offers may be encapsulated in a copy of the electronic shopping cart that is returned to the mobile device 102 for display. At block 214, a selection of one of the offers is received, for example from the mobile device 102. At block 216, the digital content is transmitted to the mobile device 102 based on the selected offer.

Figure 4:
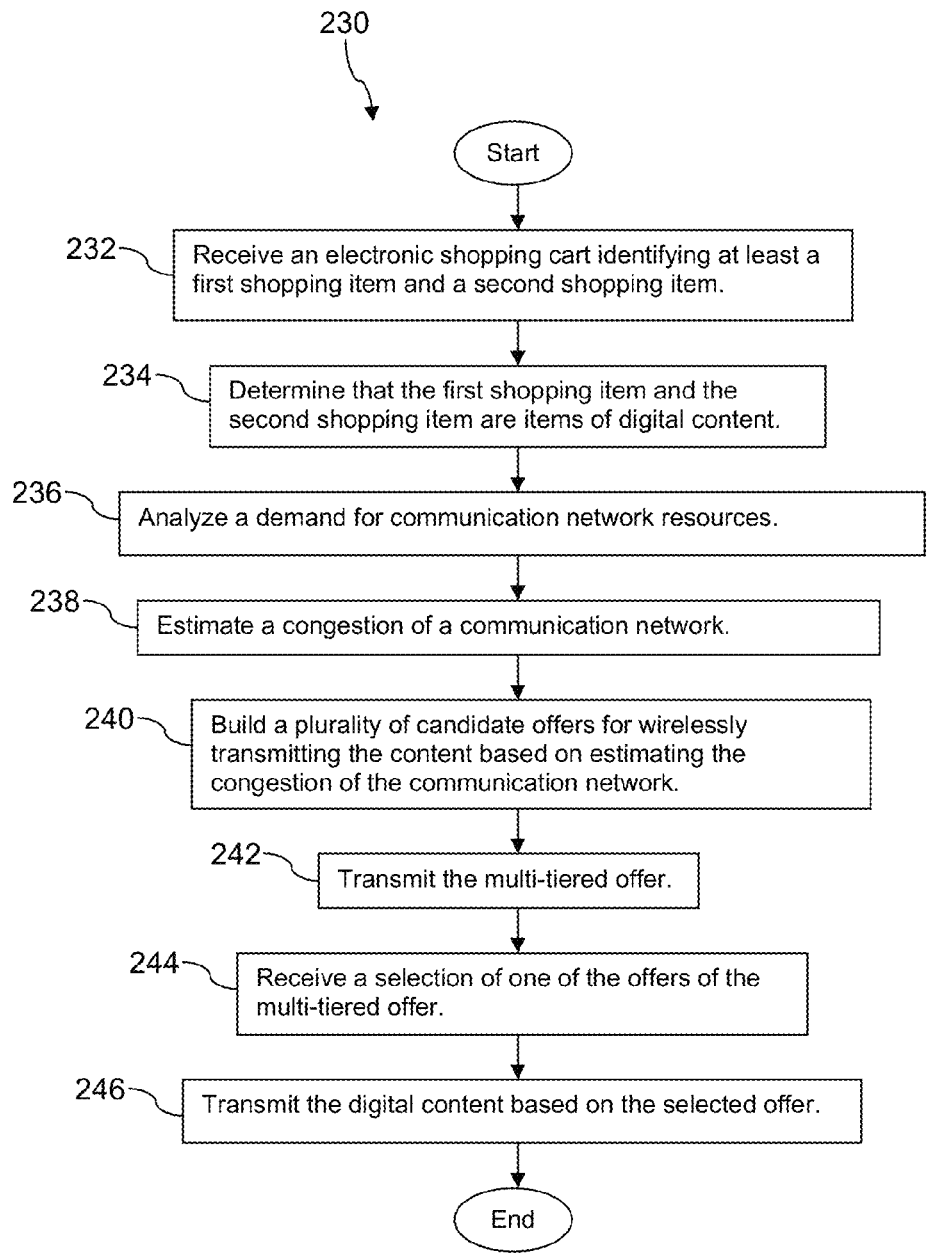
FIG. 4 is a flow chart of another method according to an embodiment of the disclosure.

Turning now to FIG. 4, a method 230 is described. Some of the processing of method 230 is similar to the processing in method 200 described above. At block 232, an electronic shopping cart is received identifying at least a first shopping item and a second shopping item. At block 234, determine that the first shopping item and the second shopping item are items of digital content. At block 236, analyze a demand for communication network resources. At block 238, estimate or model a traffic load and/or congestion of the communication network, for example a traffic load and/or congestion of the communication network at the present time, 5 seconds in the future, 10 minutes in the future, an hour in the future, or several hours in the future. In an embodiment, the congestion of the communication network may be estimated or projected for a plurality of time points over a time interval, for example every minute over a thirty minute interval, every two minutes over a one hour interval, or some other period of time.

At block 240, build a plurality of candidate offers for transmitting content based on estimating the congestion of the communication network. Consolidate the candidate offers into a multi-tiered offer. A multi-tiered offer may be an offer for providing digital content delivery at a plurality of different quality of service tiers and/or a plurality of different radio access network delivery points. The multi-tiered offer may comprise offers that provide different qualities of service for delivery of the first shopping item and for the second shopping item. For example, one offer may comprise delivering the first shopping item with a no-later-then-time delivery and delivering the second shopping item with a deferred delivery type. Alternatively, another offer may comprise delivering the first shopping item with a 2× delivery time and delivering the second shopping item with a best effort delivery type.

At block 242, transmit the multi-tiered offer. At block 244, receive a selection of one of the offers of the multi-tiered offer. At block 246, transmit the digital content based on the selected offer.

Figure 5:
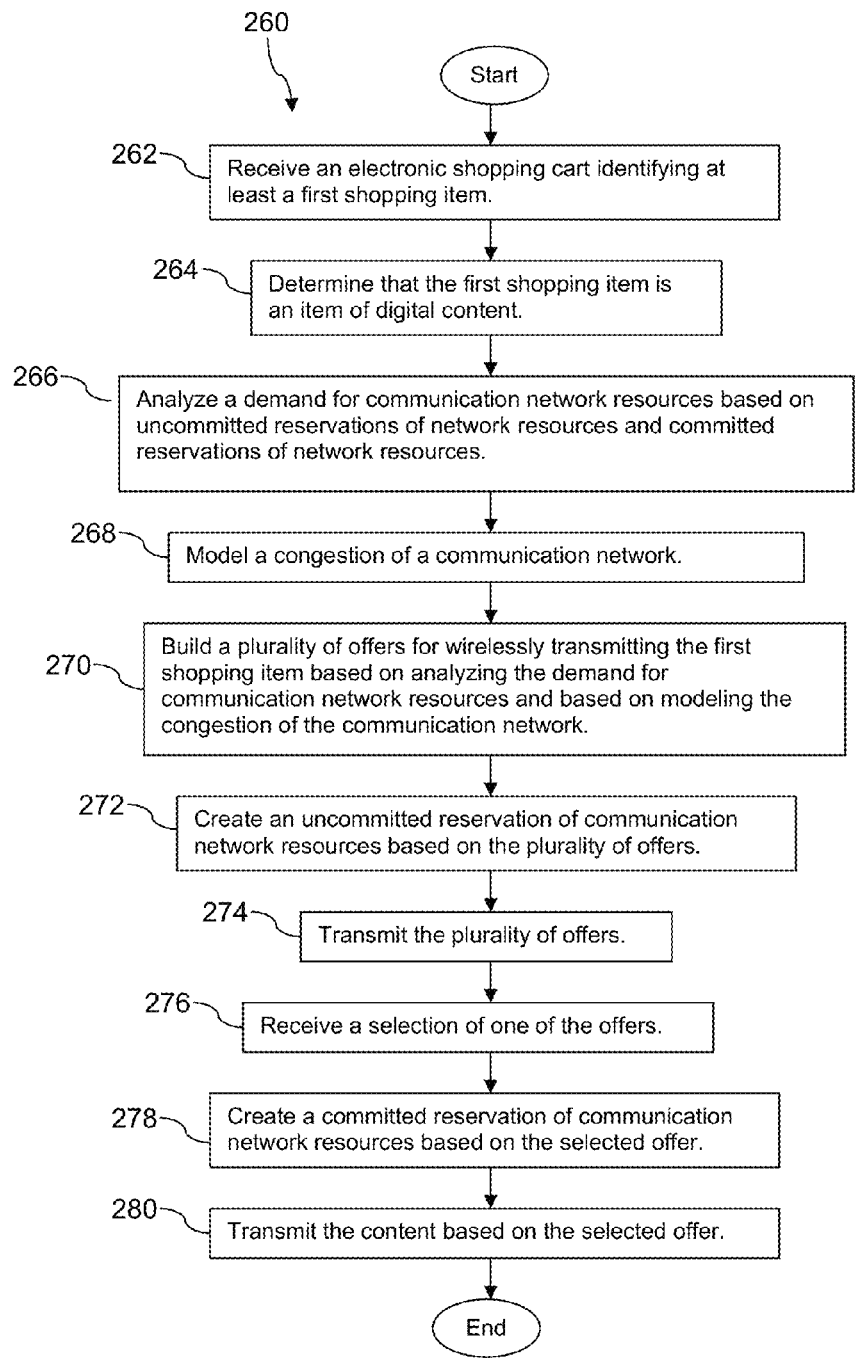
FIG. 5 is a flow chart of another method according to an embodiment of the disclosure.

Turning now to FIG. 5, a method 260 is described. Some of the processing of method 260 is similar to the processing in method 200 described above. At block 262, an electronic shopping cart identifying a least a first shopping item is received. At block 264, the first shopping item is determined to be an item of digital content. At block 266, a demand for communication network resources is determined. At block 268, a congestion of the communication network is modeled. At block 270, a plurality of offers for transmitting the first shopping item are built based on analyzing the demand for communication network resources and based on modeling the congestion of the communication network.

At block 272, create an uncommitted reservation of communication network resources based on the plurality of offers. In an embodiment, building the offers for the first shopping item in block 270 may be based at least in part on overloading or overbooking uncommitted reservations of network resources. At block 274, the plurality of offers is transmitted. At block 276, a selection of one of the offers is received. At block 278, create a committed reservation of communication network resources based on the selected offer. In some circumstances, the uncommitted reservation created in block 272 is released or destroyed. Under other circumstances, however, the uncommitted reservation created in block 272 may be converted to the committed reservation. At block 280, the content is transmitted based on the selected offer.

Figure 6A:
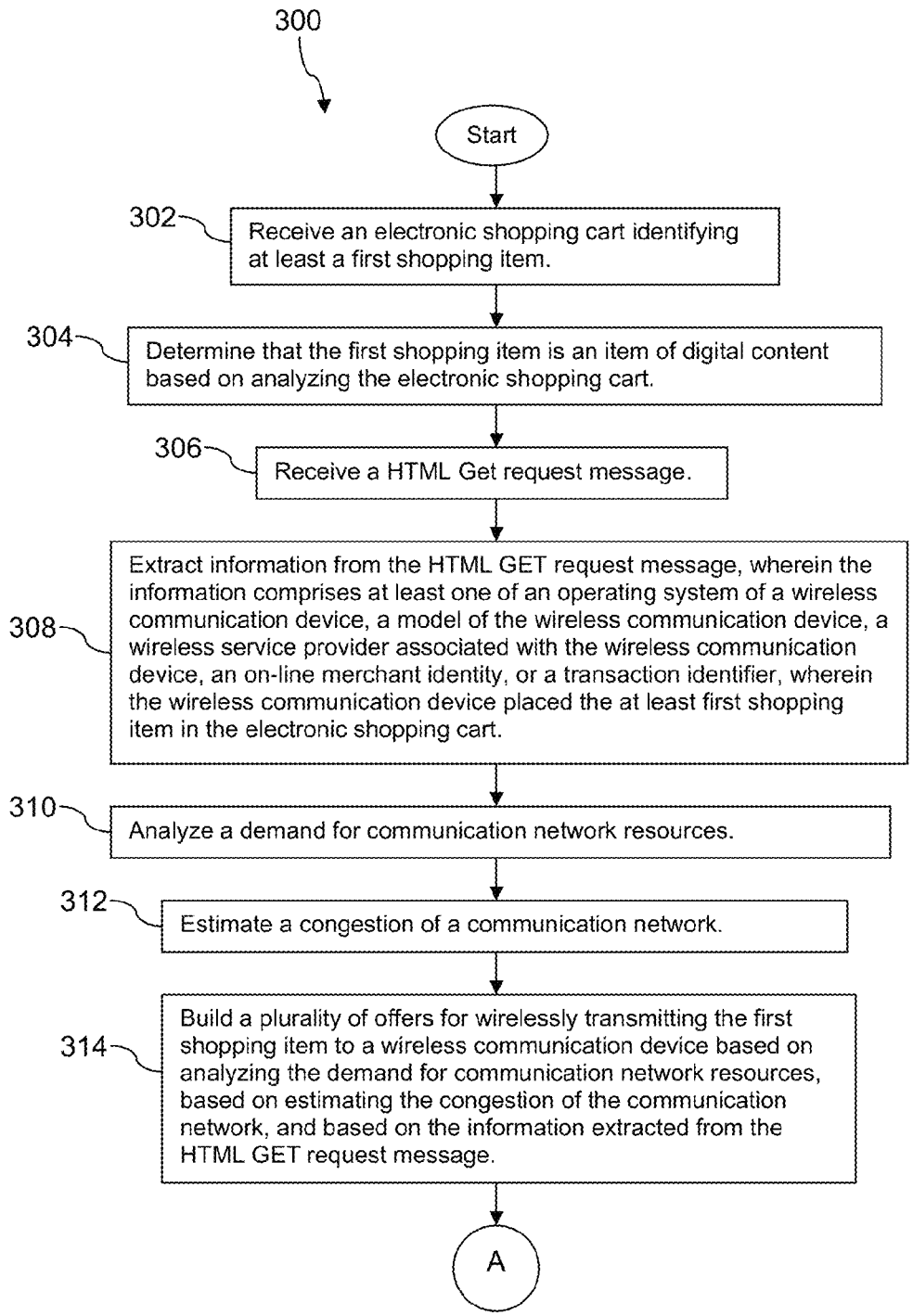
FIG. 6A is a flow chart of another method according to an embodiment of the disclosure.
Figure 6B:
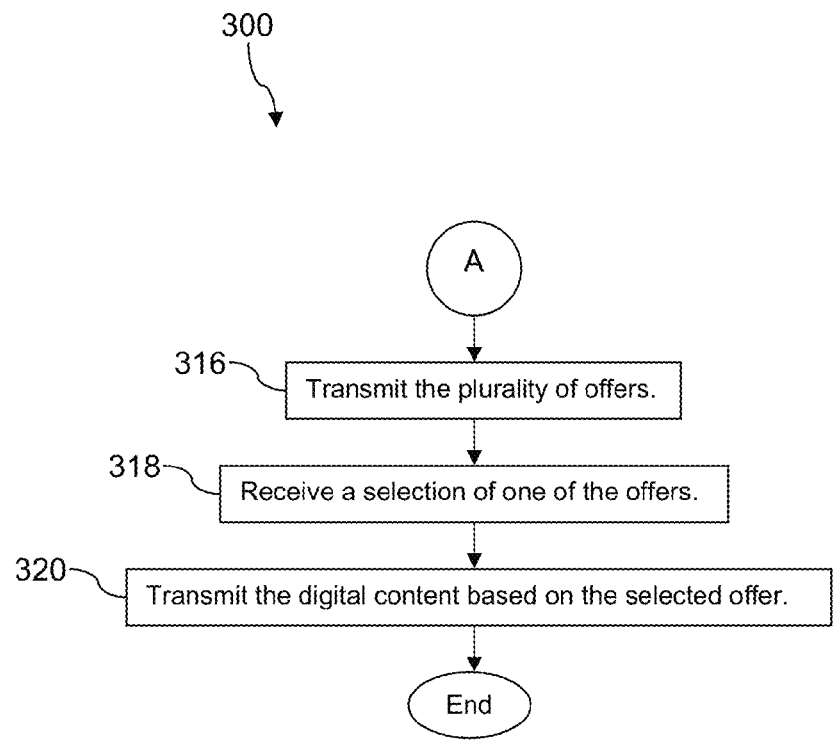
FIG. 6B is a flow chart of another method according to an embodiment of the disclosure.

Turning now to FIG. 6A and FIG. 6B, a method 300 is described. Some of the processing in method 300 may be substantially similar to some of the processing in method 200 described above. At block 302, an electronic shopping cart identifying at least a first shopping item is received. At block 304, the first shopping item is determined to be an item of digital content based on analyzing the electronic shopping cart. At block 306, an HTTP GET request message is received. At block 308, information is extracted from the HTTP GET request message, wherein the information comprises at least one of an operating system of a wireless communication device, a model of the wireless communication device, a wireless service provider associated with the wireless communication device, an on-line merchant identity, or a transaction identifier, wherein the wireless communication device placed the at least first shopping item in the electronic shopping cart. In an embodiment, the information may comprise an internet protocol address of the wireless communication device and/or a gateway the couples the wireless device into a network. Under some circumstances the wireless service provider associated with the wireless communication device and/or the service version (3G, 4G service) may be inferred from the internet protocol address and/or the gateway.

At block 310, a demand for communication network resources is analyzed. At block 312, a congestion of the communication network is estimated. At block 314, a plurality of offers for transmitting the first shopping item to a wireless communication device based on analyzing the demand for communication network resources, based on estimating the congestion of the communication network, and based on the information extracted from the HTTP GET request message is built.

At block 316, the plurality of offers is transmitted. At block 318, a selection of one of the offers is received. At block 320, the digital content is transmitted based on the selected offer.

Figure 7:
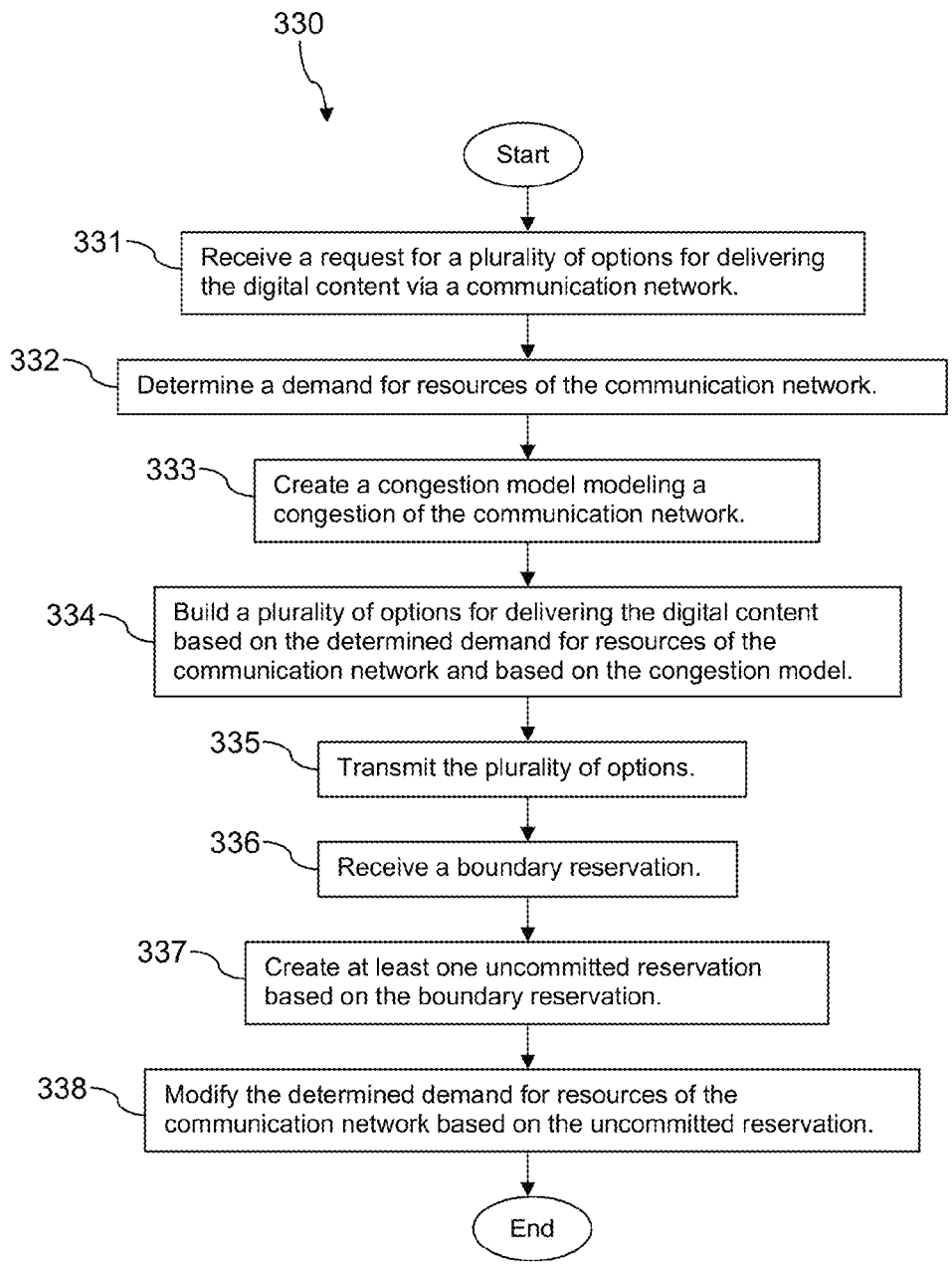
FIG. 7 is a flow chart of a method according to an embodiment of the disclosure.

Turning now to FIG. 7, a method 330 is described. At block 331, receive a request for a plurality of options for delivering the digital content via a communication network, for example via network 108 and/or the content distribution network. At block 332, determine a demand for resources of the communication network. At block 333, create a congestion model modeling a congestion of the communication network. At block 334, build a plurality of options for delivering the digital content based on the determined demand for resources of the communication network and based on the congestion model. At block 335, transmit the plurality of offers. At block 336, receive a boundary reservation. At block 337, create at least one uncommitted reservation based on the boundary reservation. At block 338, modify the determined demand for resources of the communication network based on the uncommitted reservation. The method 330 may be performed by one or more computers. For example, in an embodiment, the method 330 may be performed by the network congestion and reservation monitoring system 120 and/or the delivery offer and assurance manager 118. Alternatively, in another embodiment, another computer system may perform the method 330 by itself or in combination with other computer systems.

Figure 8:
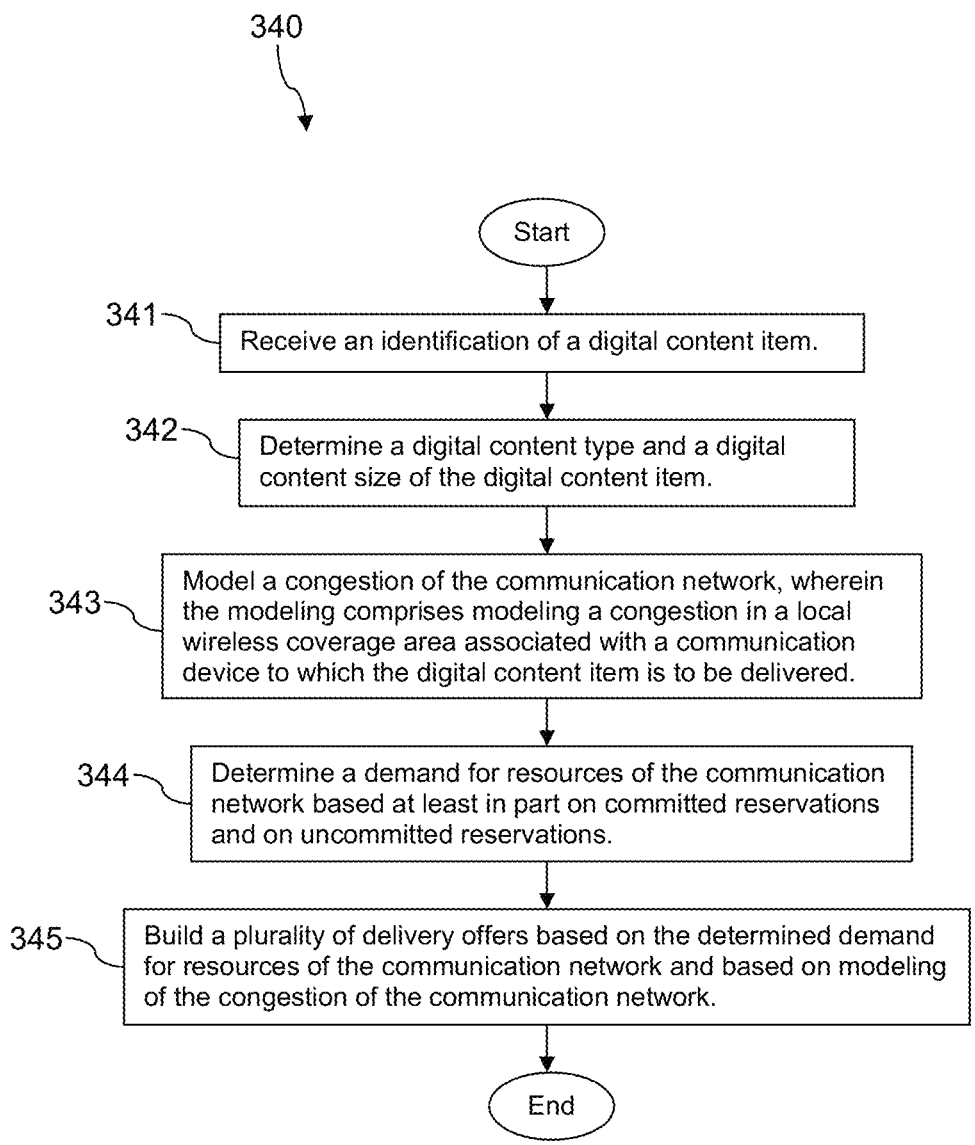
FIG. 8 is a flow chart of another method according to an embodiment of the disclosure.

Turning now to FIG. 8, a method 340 is described. At block 341, an identification of a digital content item is received. At block 342, a digital content type and a digital content size of the digital content item is determined. At block 343, model a congestion of the communication network, wherein the modeling comprises modeling a congestion in a local wireless coverage area associated with a communication device to which the digital content item is to be delivered. At block 344, determine a demand for resources of the communication network based at least in part on committed reservations and on uncommitted reservations. At block 345, build a plurality of delivery offers based on the determined demand for resources of the communication network and based on modeling of the congestion of the communication network. The method 340 may be performed by one or more computers. For example, in an embodiment, the method 340 may be performed by the network congestion and reservation monitoring system 120 and/or the delivery offer and assurance manager 118. Alternatively, in another embodiment, another computer system may perform the method 340 by itself or in combination with other computer systems.

Figure 9:
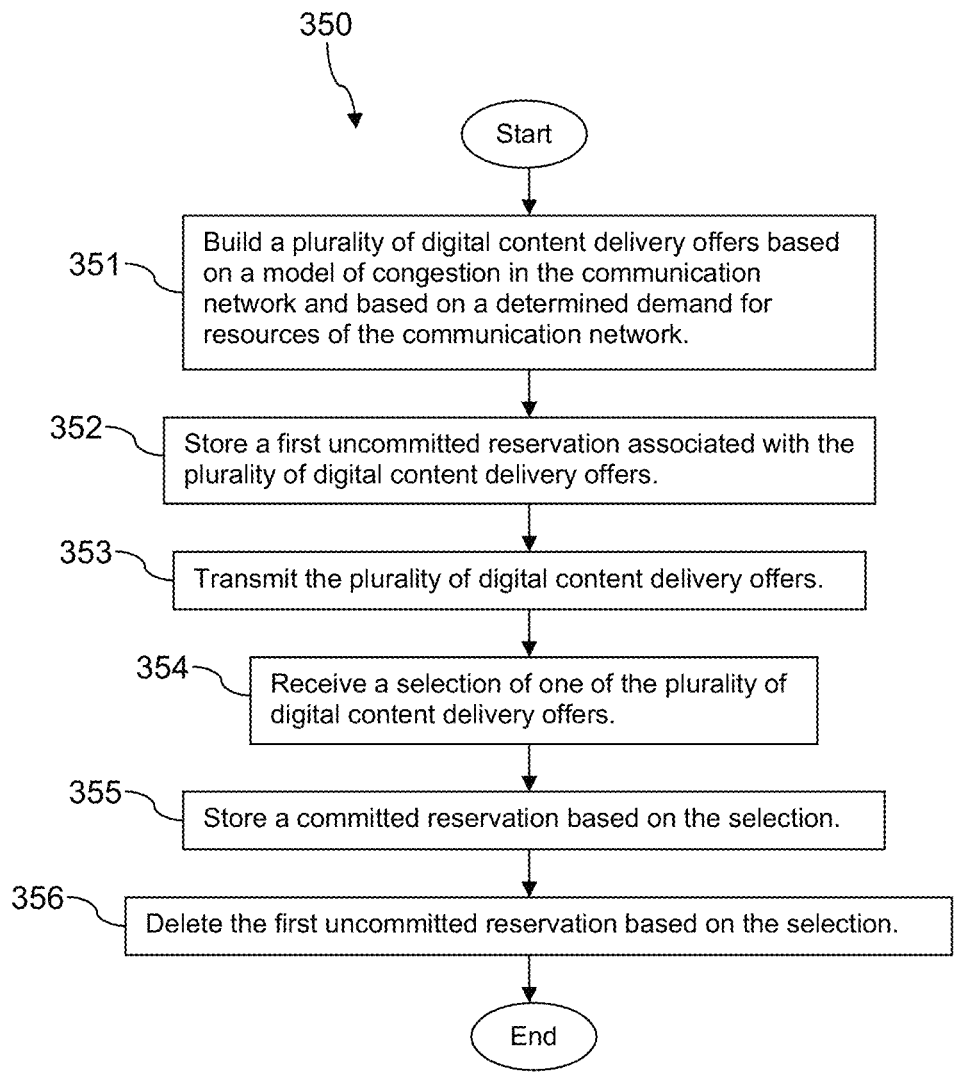
FIG. 9 is a flow chart of another method according to an embodiment of the disclosure.

Turning now to FIG. 9, a method 350 is described. At block 351, build a plurality of digital content delivery offers based on a model of congestion in the communication network and based on a determined demand for resources of the communication network. At block 352, store a first uncommitted reservation associated with the plurality of digital content delivery offers. At block 353, transmit the plurality of digital content delivery offers. At block 354, receive a selection of one of the plurality of digital content delivery offers. At block 355, store a committed reservation based on the selection. At block 356, delete the first uncommitted reservation based on the selection. The method 350 may be performed by one or more computers. For example, in an embodiment, the method 350 may be performed by the network congestion and reservation monitoring system 120 and/or the delivery offer and assurance manager 118. Alternatively, in another embodiment, another computer system may perform the method 350 by itself or in combination with other computer systems.

Figure 10:
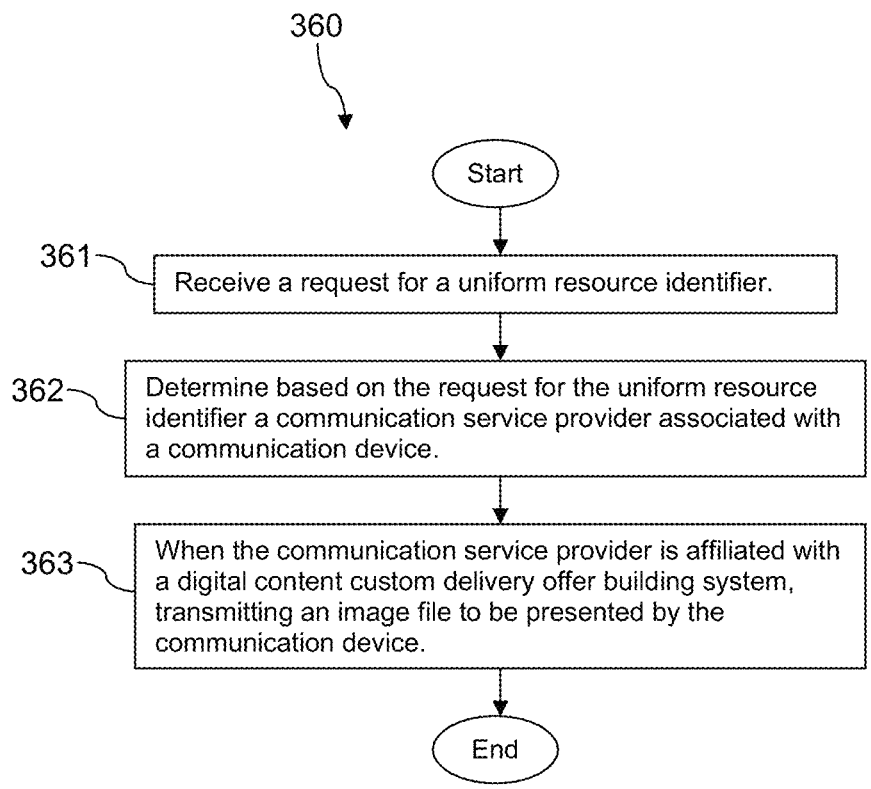
FIG. 10 is a flow chart of a method according to an embodiment of the disclosure.

Turning now to FIG. 10, a method 360 is described. At block 361, receive a request for a uniform resource identifier.

At block 362, determine based on the request for uniform resource identifier a communication service provider associated with a communication device. At block 363, when the communication service provider is affiliated with a digital content custom delivery offer building system, transmit an image file to be presented by the communication device. In an embodiment, the method 360 may further comprise determining based on the request for the uniform resource identifier at least one of an operating system and a model of the communication device and sending at least one customized digital content delivery offer to the communication device when the communication service provider is affiliated with a digital content custom delivery offer building system. The method 360 may be performed by one or more computers. For example, in an embodiment, the method 360 may be performed by the network congestion and reservation monitoring system 120 and/or the delivery offer and assurance manager 118. Alternatively, in another embodiment, another computer system may perform the method 360 by itself or in combination with other computer systems.

Figure 11:
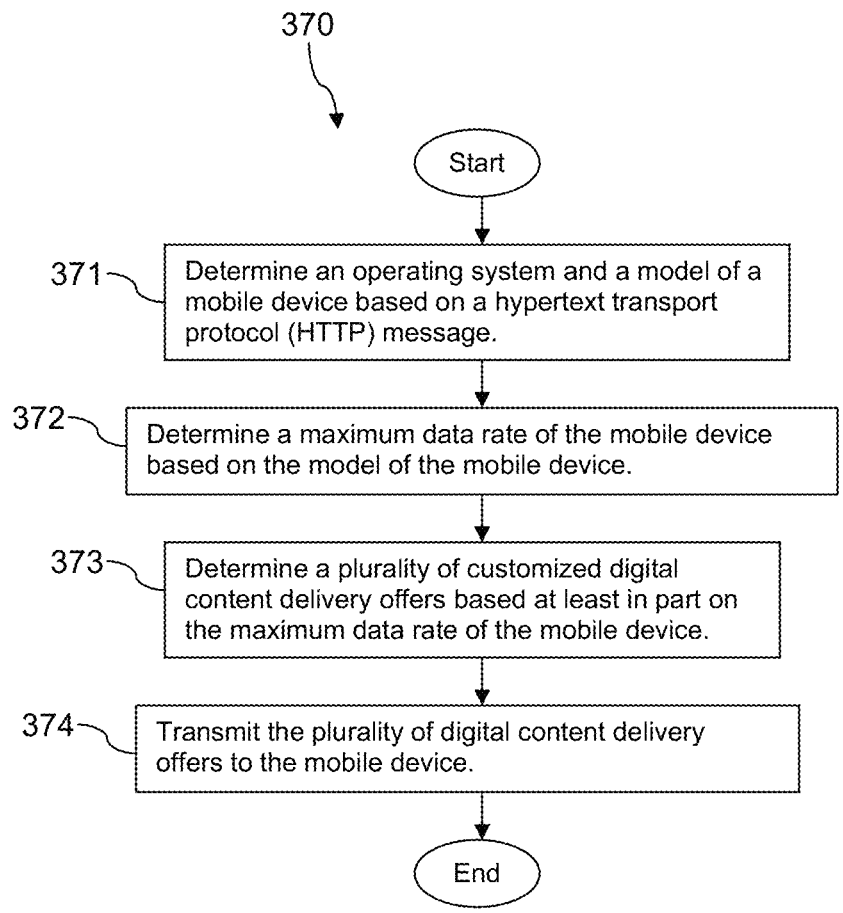
FIG. 11 is a flow chart of another method according to an embodiment of the disclosure.

Turning now to FIG. 11, a method 370 is described. At block 371, determine an operating system and a model of a mobile device based on a hypertext transport protocol (HTTP) message. In an embodiment, the HTTP message may be an HTTP GET message. Alternatively, in an embodiment, the HTTP message may be an HTTP PUT message or an HTTP POST message. The information may be extracted from an HTTP GET message, from an HTTP PUT message, or from an HTTP POST message. In addition to operating system and model of the mobile device, other information may be extracted from an HTTP GET message, an HTTP PUT message, or an HTTP POST message such as an identity of a service provider, network congestion information, and other information. At block 372, determine a maximum data rate of the mobile device based on the model of the mobile device. At block 373, determine a plurality of customized digital content delivery offers based at least in part on the maximum data rate of the mobile device. At block 374, transmit the plurality of digital content delivery offers to the mobile device. The method 370 may be performed by one or more computers. For example, in an embodiment, the method 370 may be performed by the network congestion and reservation monitoring system 120 and/or the delivery offer and assurance manager 118. Alternatively, in another embodiment, another computer system may perform the method 370 by itself or in combination with other computer systems.

Figure 12:
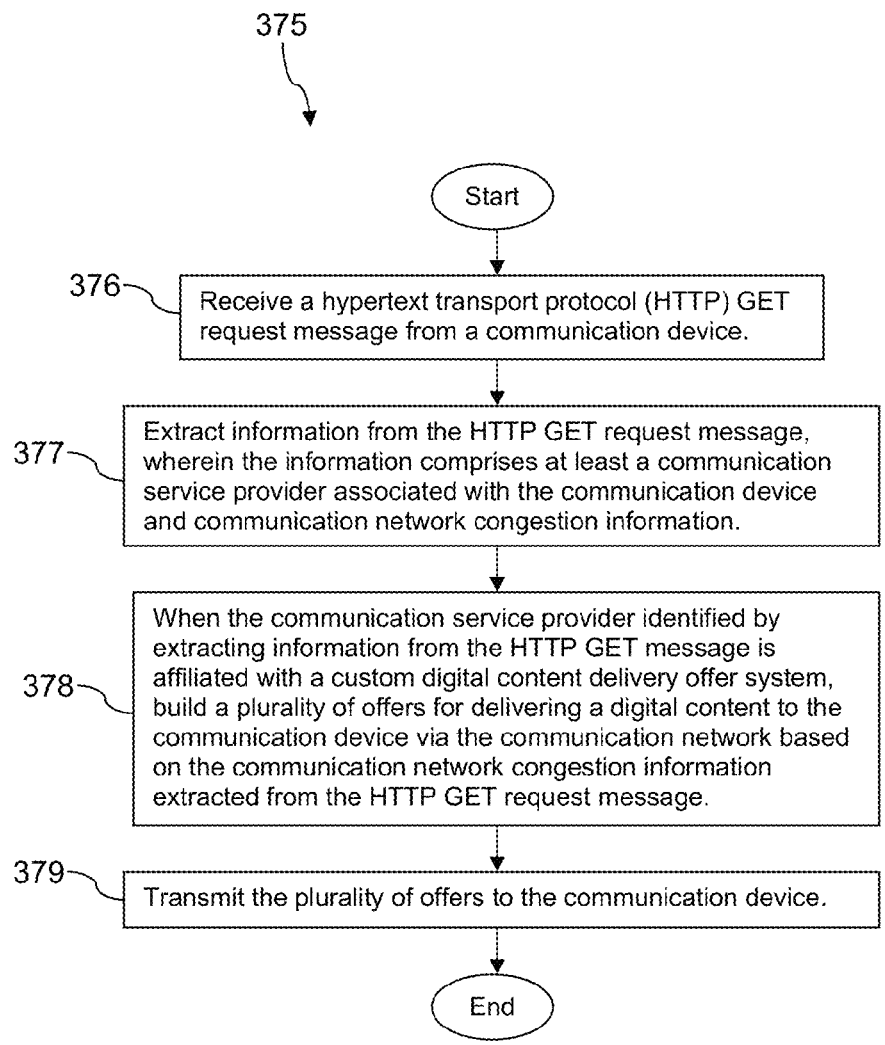
FIG. 12 is a flow chart of another method according to an embodiment of the disclosure.

Turning now to FIG. 12, a method 375 is described. At block 376, receive a hypertext transport protocol (HTTP) GET request message from a communication device. Alternatively, in an embodiment, the processing at block 376 may receive an HTTP PUT message or an HTTP POST message from the communication device. At block 377, extract information from the HTTP GET request message (or the HTTP PUT message or the HTTP POST message), wherein the information comprises at least a communication service provider associated with the communication device and communication network congestion information. At block 378, when the communication service provider identified by extracting information from the HTTP GET message (or the HTTP PUT message or the HTTP POST message) is affiliated with a custom digital content delivery offer system, build a plurality of offers for delivering a digital content to the communication device via the communication network based on the communication network congestion information extracted from the HTTP GET request message (or the HTTP PUT message or the HTTP POST message). At block 379, transmit the plurality of offers to the communication device. The method 375 may be performed by one or more computers. For example, in an embodiment, the method 375 may be performed by the network congestion and reservation monitoring system 120 and/or the delivery offer and assurance manager 118. Alternatively, in another embodiment, another computer system may perform the method 375 by itself or in combination with other computer systems.

For further details about real-time brokering of digital content delivery, see U.S. patent application Ser. No. 13/594,778 filed Aug. 24, 2012, entitled "Reservations in Real-Time Brokering of Digital Content Delivery," by Lyle T. Bertz, et al., and U.S. patent application Ser. No. 13/594,779 filed Aug. 24, 2012, entitled "File Retrieval in Real-Time Brokering of Digital Content Delivery," by Lyle T. Bertz, et al., which are incorporated herein by reference in their entirety.

Figure 13:
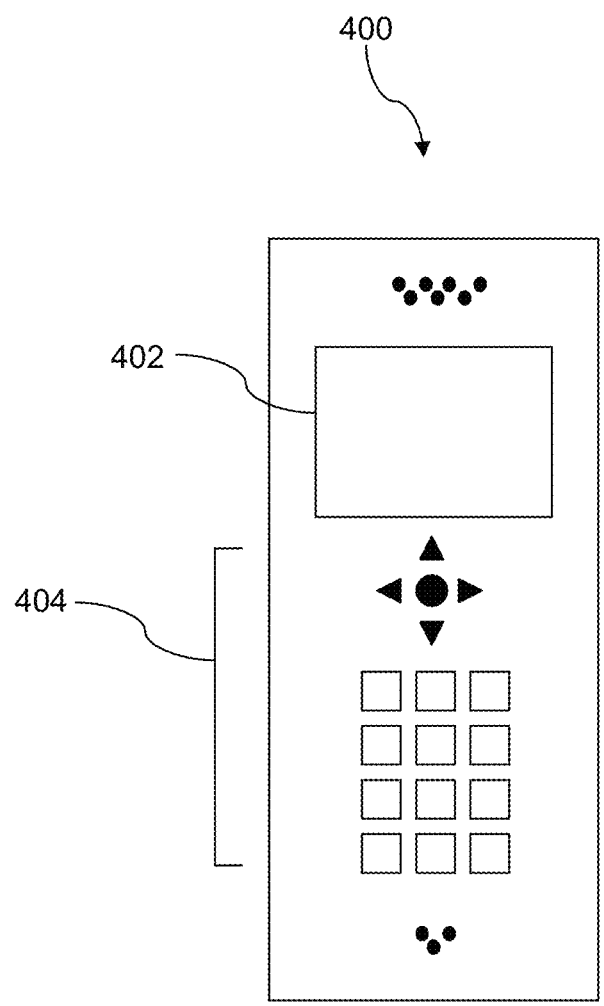
FIG. 13 is an illustration of a mobile phone according to an embodiment of the disclosure.

FIG. 13 depicts the mobile device 400, which is operable for implementing aspects of the present disclosure, but the present disclosure should not be limited to these implementations. For example, in an embodiment, the mobile device 102 may be implemented substantially in the form of the mobile device 400. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 14:
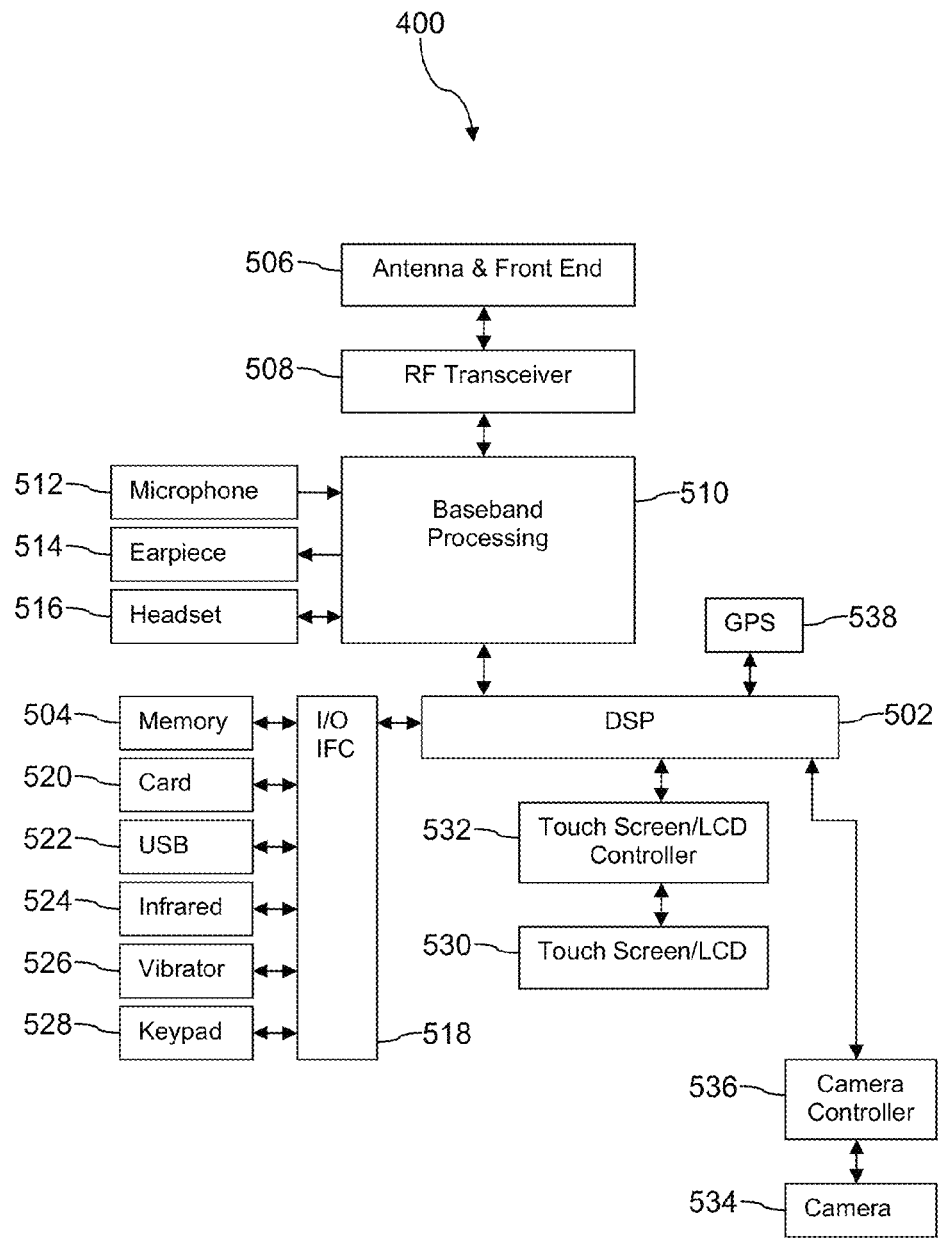
FIG. 14 is a block diagram of a hardware architecture according to an embodiment of the disclosure.

FIG. 14 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 15A:
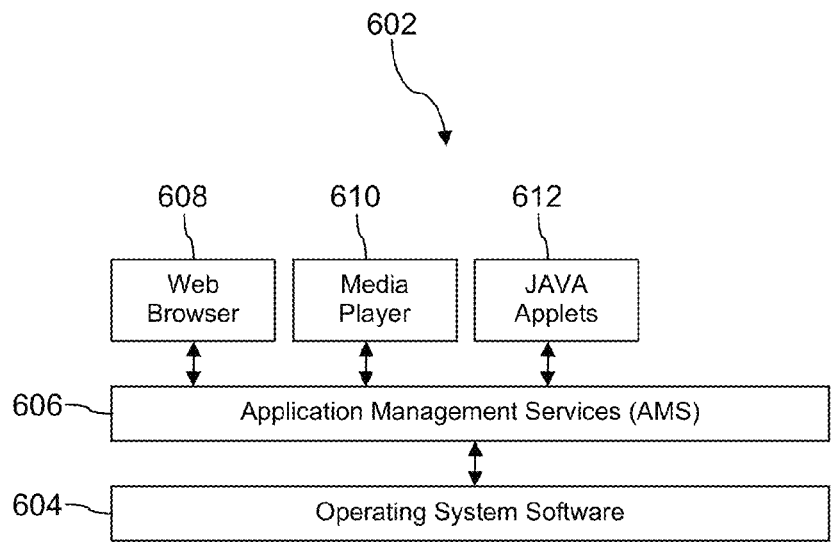
FIG. 15A is a block diagram of a software architecture according to an embodiment of the disclosure.

FIG. 15A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 15A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 15B:
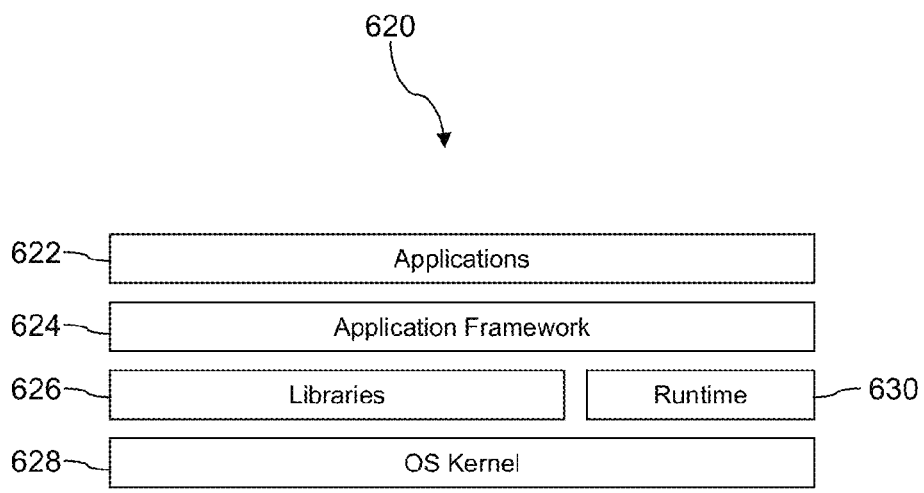
FIG. 15B is a block diagram of another software architecture according to an embodiment of the disclosure.

FIG. 15B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 16:
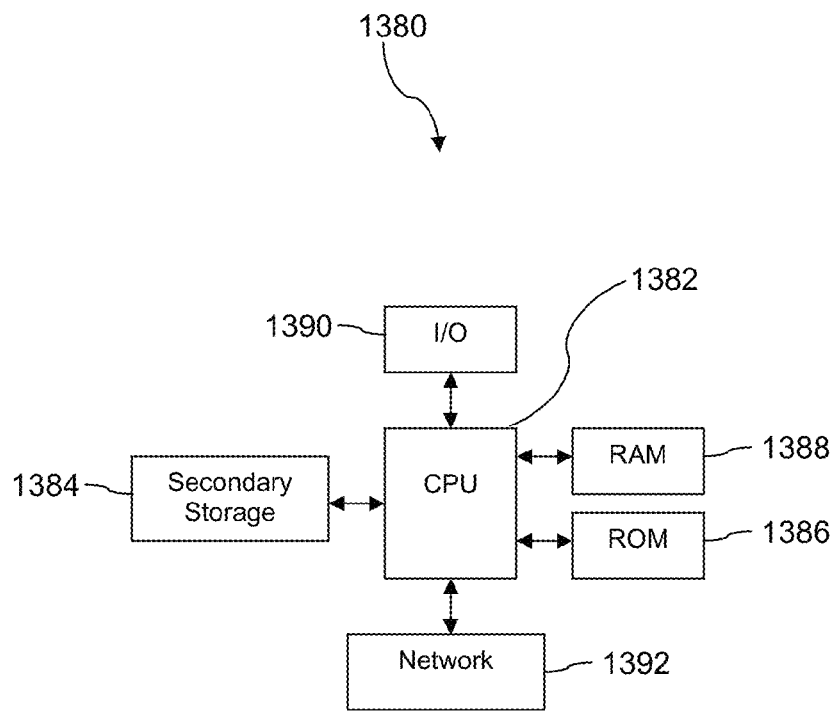
FIG. 16 is a block diagram of a computer system according to an embodiment of the disclosure.

FIG. 16 illustrates a computer system 1380 suitable for implementing one or more embodiments disclosed herein. The computer system 1380 includes a processor 1382 (which may be referred to as a central processor unit or CPU) that is in communication with memory devices including secondary storage 1384, read only memory (ROM) 1386, random access memory (RAM) 1388, input/output (I/O) devices 1390, and network connectivity devices 1392. The processor 1382 may be implemented as one or more CPU chips.

It is understood that by programming and/or loading executable instructions onto the computer system 1380, at least one of the CPU 1382, the RAM 1388, and the ROM 1386 are changed, transforming the computer system 1380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 1384 is typically comprised of one or more disk drives or tape drives and is used for non-volatile storage of data and as an over-flow data storage device if RAM 1388 is not large enough to hold all working data. Secondary storage 1384 may be used to store programs which are loaded into RAM 1388 when such programs are selected for execution. The ROM 1386 is used to store instructions and perhaps data which are read during program execution. ROM 1386 is a non-volatile memory device which typically has a small memory capacity relative to the larger memory capacity of secondary storage 1384. The RAM 1388 is used to store volatile data and perhaps to store instructions. Access to both ROM 1386 and RAM 1388 is typically faster than to secondary storage 1384. The secondary storage 1384, the RAM 1388, and/or the ROM 1386 may be referred to in some contexts as computer readable storage media and/or non-transitory computer readable media.

I/O devices 1390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 1392 may enable the processor 1382 to communicate with the Internet or one or more intranets. With such a network connection, it is contemplated that the processor 1382 might receive information from the network, or might output information to the network in the course of performing the above-described method steps. Such information, which is often represented as a sequence of instructions to be executed using processor 1382, may be received from and outputted to the network, for example, in the form of a computer data signal embodied in a carrier wave.

Such information, which may include data or instructions to be executed using processor 1382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 1382 executes instructions, codes, computer programs, scripts which it accesses from hard disk, floppy disk, optical disk (these various disk based systems may all be considered secondary storage 1384), ROM 1386, RAM 1388, or the network connectivity devices 1392. While only one processor 1382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1384, for example, hard drives, floppy disks, optical disks, and/or other device, the ROM 1386, and/or the RAM 1388 may be referred to in some contexts as non-transitory instructions and/or non-transitory information.

In an embodiment, the computer system 1380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1380 to provide the functionality of a number of servers that is not directly bound to the number of computers in the computer system 1380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1380, at least portions of the contents of the computer program product to the secondary storage 1384, to the ROM 1386, to the RAM 1388, and/or to other non-volatile memory and volatile memory of the computer system 1380. The processor 1382 may process the executable instructions and/or data structures in part by directly accessing the computer program product, for example by reading from a CD-ROM disk inserted into a disk drive peripheral of the computer system 1380. Alternatively, the processor 1382 may process the executable instructions and/or data structures by remotely accessing the computer program product, for example by downloading the executable instructions and/or data structures from a remote server through the network connectivity devices 1392. The computer program product may comprise instructions that promote the loading and/or copying of data, data structures, files, and/or executable instructions to the secondary storage 1384, to the ROM 1386, to the RAM 1388, and/or to other non-volatile memory and volatile memory of the computer system 1380.

In some contexts, the secondary storage 1384, the ROM 1386, and the RAM 1388 may be referred to as a non-transitory computer readable medium or a computer readable storage media. A dynamic RAM embodiment of the RAM 1388, likewise, may be referred to as a non-transitory computer readable medium in that while the dynamic RAM receives electrical power and is operated in accordance with its design, for example during a period of time during which the computer 1380 is turned on and operational, the dynamic RAM stores information that is written to it. Similarly, the processor 1382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of transmitting digital content, comprising:
    receiving, by a computer, an electronic shopping cart identifying at least a first shopping item and a second shopping item;
    determining, by a computer, that the first shopping item and the second shopping item are items of digital content;
    analyzing, by a computer, a demand for communication network resources;
    estimating, by a computer, a congestion of a communication network;
    building, by a computer, a plurality of candidate offers for wirelessly transmitting the digital content based on estimating the congestion of the communication network;
    building, by a computer, a multi-tiered offer for wirelessly transmitting digital content, wherein the multi-tiered offer comprises at least two but not all of the candidate offers, wherein the multi-tiered offer provides alternatives for delivering the first shopping item and the second shopping item;
    creating, by a computer, an uncommitted reservation of communication network resources for the multi-tiered offer based on a boundary reservation, wherein the uncommitted reservation is determined based on potential consumption of communication network resources when fulfilling at least one offer of the multi-tiered offer;
    transmitting, by a computer, the multi-tiered offer;
    receiving, by a computer, a selection of one of the offers of the multi-tiered offer;
    transmitting, by a computer, the digital content based on the selected offer; and
    creating, by a computer, a committed reservation of communication network resources based on the selected offer.

2. The method of claim 1, wherein the multi-tiered offer comprises a first offer based on transmitting the digital content using a first content delivery network and a second offer based on transmitting the digital content using a second content delivery network, wherein the first content delivery network is different from the second content delivery network.

3. The method of claim 2, wherein the first offer is based on delivering the digital content to a mobile communication device via a worldwide interoperability for microwave access (WiMAX) wireless link, a Wi-Fi wireless link, or a Bluetooth wireless link and the second offer is based on delivering the digital content to the mobile communication device via one of a code division multiple access (CDMA) cellular wireless link or a long term evolution cellular wireless link.

4. The method of claim 1, wherein the multi-tiered offer comprises a first offer based on providing a discount for transmitting the content at a deferred time at least one hour in the future and a second offer based on charging a higher price for an enhanced quality of service.

5. The method of claim 4, wherein the enhanced quality of service comprises one of expedited delivery, as soon as possible delivery, no later than delivery, deferred delivery, or assured delivery.

6. The method of claim 1, wherein one of the offers of the multi-tiered offer defines a first quality of service for transmitting the digital content associated with the first shopping item and a second quality of service for transmitting the digital content associated with the second shopping item, and wherein the first quality of service is different from the second quality of service.

7. The method of claim 1, wherein the multi-tiered offer is based on delivering the digital content over a wired connection to a communication device, and wherein transmitting the digital content based on the selected offer comprises transmitting the digital content via a wired connection to the communication device.

8. The method of claim 1, further comprising determining, by a computer, information about a wireless communication device that placed the first and second shopping items in the electronic shopping cart, and wherein determining the plurality of candidate offers for wirelessly transmitting the first and second shopping items to the wireless communication device is further based on the information about the wireless communication device.

9. The method of claim 1, wherein the multi-tiered offer comprises an offer that defines a price to be paid in exchange for a premium mode of wirelessly transmitting the digital content.

10. The method of claim 1, wherein the multi-tiered offer comprises an offer that defines an amount of money to be credited to a wireless communication service account or a coupon offered as an incentive for accepting the offer, wherein the offer promotes deferring wirelessly transmitting the digital content to at least two hours in the future.

11. The method of claim 1, wherein estimating the congestion of the communication network comprises analyzing uncommitted reservations of communication network resources.

12. The method of claim 11, wherein estimating the congestion of the communication network further comprises analyzing committed reservations of communication network resources.

13. The method of claim 1, wherein the potential consumption of the communication network resources is a worst case scenario.

14. The method of claim 1, further comprising deleting the uncommitted reservation of communication network resources in response to receiving the selection of one of the offers.

15. The method of claim 1, further comprising converting the uncommitted reservation of communication network resources to the committed reservation of communication network resources in response to receiving the selection of one of the offers.

16. The method of claim 1, wherein estimating the congestion of the communication network resources comprises analyzing explicit congestion notification (ECN) content in headers of packets transmitted in the communication network.

17. The method of claim 16, further comprising determining, by a computer, a location of congestion in the communication network based on the explicit congestion notification content in headers of packets transmitted in the communication network.

18. The method of claim 1, wherein the digital content comprises one of music and video.

* * * * *